(12) United States Patent  
Hui et al.

(10) Patent No.: US 9,001,676 B2  
(45) Date of Patent: Apr. 7, 2015

(54) COLLECTING POWER OUTAGE NOTIFICATIONS IN A FREQUENCY HOPPING COMMUNICATION NETWORK

(75) Inventors: Jonathan W. Hui, Foster City, CA (US); Wei Hong, Berkeley, CA (US); Lik Chuen Alec Woo, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 825 days.

(21) Appl. No.: 13/192,802

(22) Filed: Jul. 28, 2011

(65) Prior Publication Data

US 2013/0028295 A1      Jan. 31, 2013

(51) Int. Cl.
*G01R 31/08*      (2006.01)
*H04B 1/713*      (2011.01)

(52) U.S. Cl.
CPC ...................................... *H04B 1/713* (2013.01)

(58) Field of Classification Search
CPC . H04W 24/00; H04W 52/46; H04W 72/0446; H04W 88/08; H04L 43/50; H04L 43/0852; H04L 43/08; H04L 47/50; H04L 47/622; H04L 5/06; H04B 17/003; H04B 7/18543; H04J 1/00
USPC ...................... 370/252, 318, 330, 395.4, 480; 375/132; 340/635
See application file for complete search history.

(56) References Cited

U.S. PATENT DOCUMENTS

| | | | |
|---|---|---|---|
| 6,424,930 B1 * | 7/2002 | Wood | 702/184 |
| 6,795,426 B1 | 9/2004 | Raleigh et al. | |
| 6,963,285 B2 * | 11/2005 | Fischer et al. | 340/635 |
| 7,190,686 B1 | 3/2007 | Beals | |
| 7,240,224 B1 | 7/2007 | Biederman | |
| 7,457,973 B2 * | 11/2008 | Liu | 713/310 |
| 7,472,290 B2 | 12/2008 | Diab et al. | |
| 7,483,444 B2 | 1/2009 | Raleigh et al. | |
| 7,706,741 B2 | 4/2010 | Patel et al. | |
| 2011/0075704 A1 * | 3/2011 | Bettendorff et al. | 375/133 |
| 2012/0093095 A1 * | 4/2012 | Barbieri et al. | 370/329 |

OTHER PUBLICATIONS

"RPL: IPv6 Routing Protocol for Low Power and Lossy Networks" <draft-ietf-roll-rpl-19> by Winter, at al. (Mar. 13, 2011 version).

* cited by examiner

*Primary Examiner* — Un C Cho
*Assistant Examiner* — Natali N Pascual Peguero
(74) *Attorney, Agent, or Firm* — Parker Ibrahim & Berg LLC; James M. Behmke; Stephen D. LeBarron

(57) ABSTRACT

In one embodiment, a device in a frequency hopping communication network operate in a first mode according to a common broadcast schedule for the network that simultaneously overlays a first configured portion of all independently determined unicast listening schedules in the network. In response to determining a power outage condition, the device switches to operation in a power outage mode where the common broadcast schedule for the network in the power outage mode simultaneously overlays a second configured portion of all independently determined unicast listening schedules in the network, the second configured portion greater than the first configured portion. In one embodiment, the device broadcasts one or more power outage notifications (PONs) in response to determining the power outage condition as a reduction of a main power supply at the device. In another embodiment, the device receives a PON while powered as the power outage condition.

24 Claims, 20 Drawing Sheets

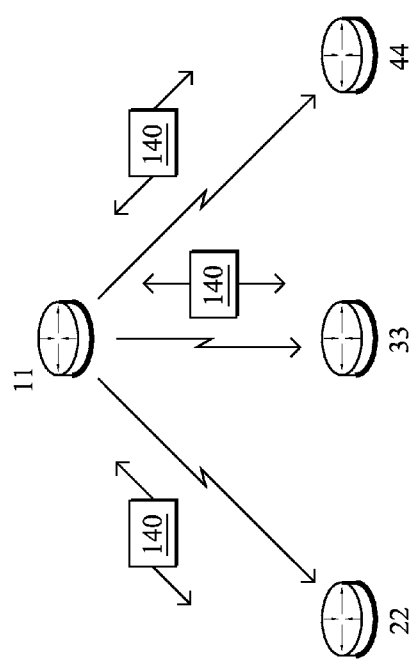
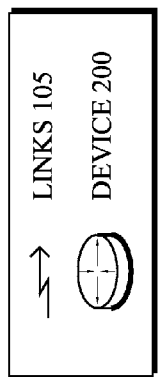
FIG. 1

INDEPENDENT LISTENING SCHEDULES/SEQUENCES 400

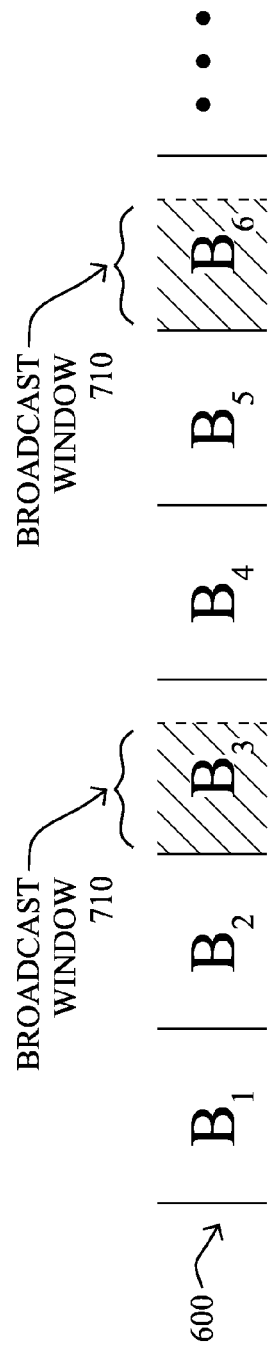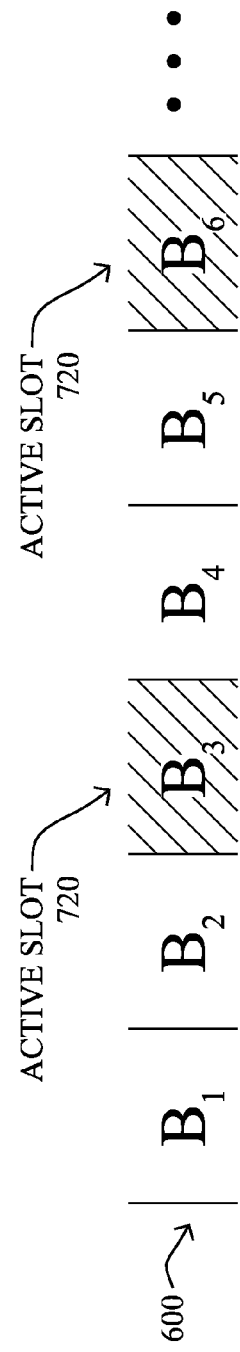
FIG. 7A
FIG. 7B

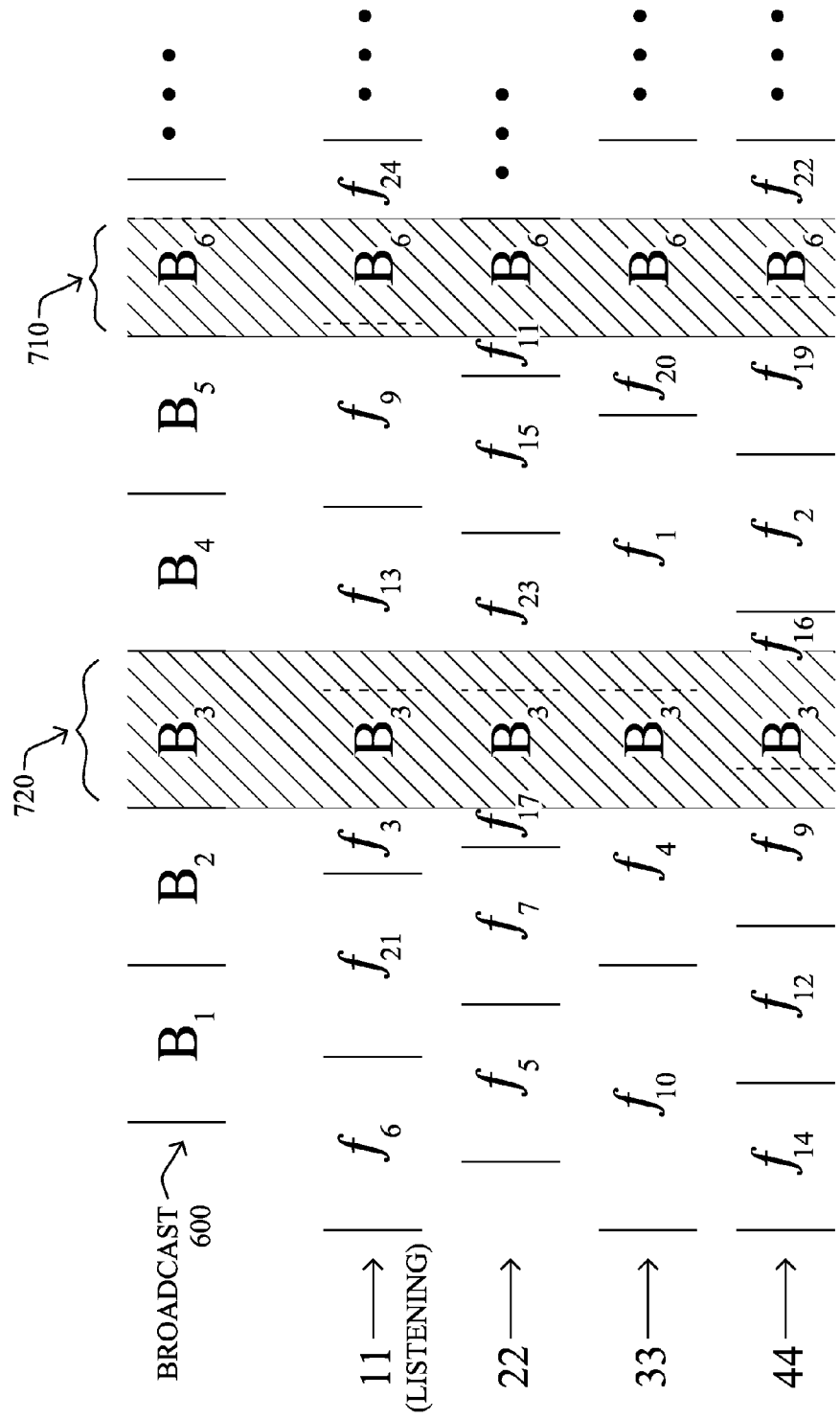

COLLECTING POWER OUTAGE NOTIFICATIONS IN A FREQUENCY HOPPING COMMUNICATION NETWORK

TECHNICAL FIELD

The present disclosure relates generally to shared media communication, and, more particularly, to unicast and broadcast schedules during power outages in frequency hopping networks.

BACKGROUND

Mesh networks are composed of two or more electronic devices each containing at least one transceiver. The electronic devices use their transceivers to communicate with one another and/or a central device. If the device wishes to communicate with another device that is out of transmission range, the device may communicate via multi-hop communication through other devices. In a frequency hopping (or channel hopping) mesh network, devices communicate using different frequencies/channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on at what time.

Channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering.

Existing systems optimize for both unicast and broadcast communication by synchronizing the entire network to the same channel-switching schedule and using a central coordinator to compute and configure channel schedules for each individual device. However, this method adds significant delay and communication overhead to coordinate new schedules between each transmitter-receiver pair. Other systems provide a hybrid approach, where the communication is divided between independently schedule unicast schedules and a shared broadcast transmission schedule.

Because the devices may rely on a small source of stored energy (e.g., batteries or a capacitor) during a power outage of a main power supply, only a limited lifespan of the backup power (e.g., battery or capacitor) may be used to transmit information. In particular, the Advanced Metering Infrastructure (AMI) application requires devices to communicate a Power Outage Notification (PON) when main-power is no longer available. Certain residential meters today currently store enough energy to allow for 30 seconds of uptime and 3 packet transmissions. Since a device does not know what neighbors are affected by the power outage event, it broadcasts the PON three times within the 30-second window. However, because a large number of spatially correlated devices may be affected by a single power outage event, significant congestion can occur due to PON transmissions.

Note also that in the hybrid channel-hopping scheme mentioned above, the congestion of PONs may be exacerbated by only allowing broadcast communication for a faction of time.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 1 illustrates an example wireless network;

FIG. 5 illustrates example independently determined and independently timed unicast frequency hopping sequences;

FIGS. 7A-7B illustrate an example overlay broadcast schedule;

FIG. 8 illustrates an example of the broadcast schedule overlaid on the independent unicast sequences;

DESCRIPTION OF EXAMPLE EMBODIMENTS

Overview

Figure 2:
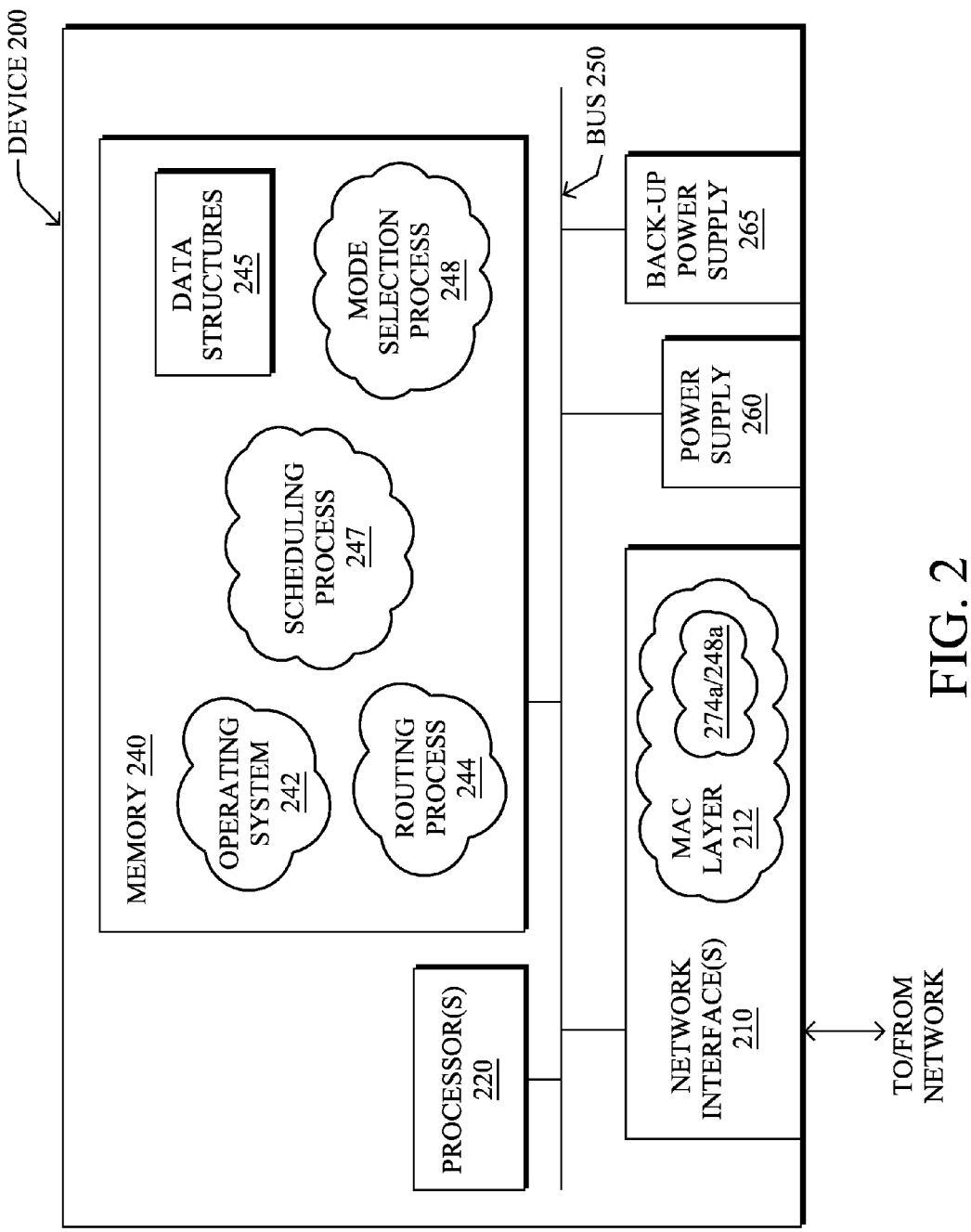
FIG. 2 illustrates an example wireless device/node.

According to one or more embodiments of the disclosure, a device (e.g., and all other devices, generally) in a frequency hopping communication network operate in a first mode according to a common broadcast schedule for the network that simultaneously overlays a first configured portion of all independently determined unicast listening schedules in the network. In response to determining a power outage condition, the device switches to operation in a power outage mode where the common broadcast schedule for the network in the power outage mode simultaneously overlays a second configured portion of all independently determined unicast listening schedules in the network, the second configured portion greater than the first configured portion. In one embodiment, the device broadcasts one or more power outage notifications (PONs) in response to determining the power outage condition as a reduction of a main power supply at the device. In another embodiment, the device receives a PON while powered as the power outage condition, and switches from the first mode to the power outage mode in response to the received PON.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

A wireless network, in particular, is a type of shared media network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities" (e.g., for Advanced Metering Infrastructure or "AMI" applications) and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example (and vastly simplified) computer network 100 (e.g., wireless or otherwise) illustratively comprising nodes/devices 200 (e.g., labeled as shown, "11," "22," "33," and "44") interconnected by frequency-hopping communication links 105, as described below. In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the wireless network, and that the view shown herein is for simplicity (particularly, that while routers are shown, any wireless communication devices 11-44 may be utilized). Also, while the embodiments are illustratively shown herein with reference to a generally wireless network, the description herein is not so limited, and may be applied to networks that have wired links, wireless links, PLC links, etc.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate (e.g., PLC). As described herein, the communication may be based on a frequency-hopping protocol. In this context, a protocol consists of a set of rules defining how the nodes interact with each other.

FIG. 2 is a schematic block diagram of an example node/device 200 that may be used with one or more embodiments described herein, e.g., as nodes 11-44. The device may comprise one or more network interfaces 210 (e.g., wireless/frequency-hopping), at least one processor 220, and a memory 240 interconnected by a system bus 250, as well as a main power supply 260 (e.g., plug-in) and a backup power supply 265 (battery, capacitor, etc.).

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art, particularly for frequency-hopping communication as described herein. In addition, the interfaces 210 may comprise an illustrative media access control (MAC) layer module 212 (and other layers, such as the physical or "PHY" layer, as will be understood by those skilled in the art). Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "scheduling" process 247 and "mode selection" process 248 as described in greater detail below. Note that while scheduling process 247 and mode selection process 248 are shown in centralized memory 240, alternative embodiments provide for either or both of the processes to be specifically operated within the network interfaces 210, such as a component of MAC layer 212 (process "247a/248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Figure 3:
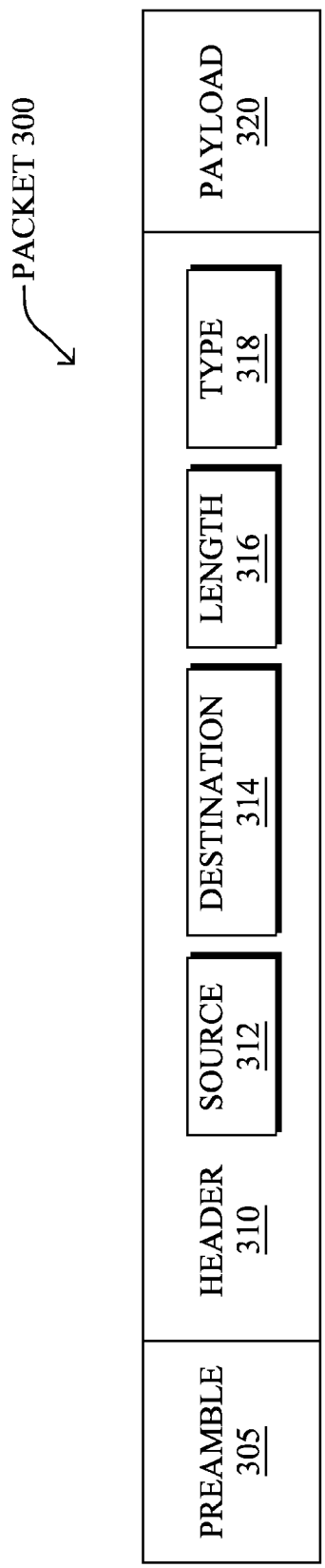
FIG. 3 illustrates an example wireless message/packet.

FIG. 3 illustrates an example simplified message/packet format 300 that may be used to communicate information between devices 200 in the network. For example, message 300 illustratively comprises a header 310 with one or more fields such as a source address 312, a destination address 314, a length field 316, a type field 318, as well as other fields, such as Cyclic Redundancy Check (CRC) error-detecting code to ensure that the header information has been received uncorrupted, as will be appreciated by those skilled in the art. Within the body/payload 320 of the message may be any information to be transmitted, such as user data, control-plane data, etc. In addition, based on certain wireless communication protocols, a preamble 305 may precede the message 300 in order to allow receiving devices to acquire the transmitted message, and synchronize to it, accordingly.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 4A:
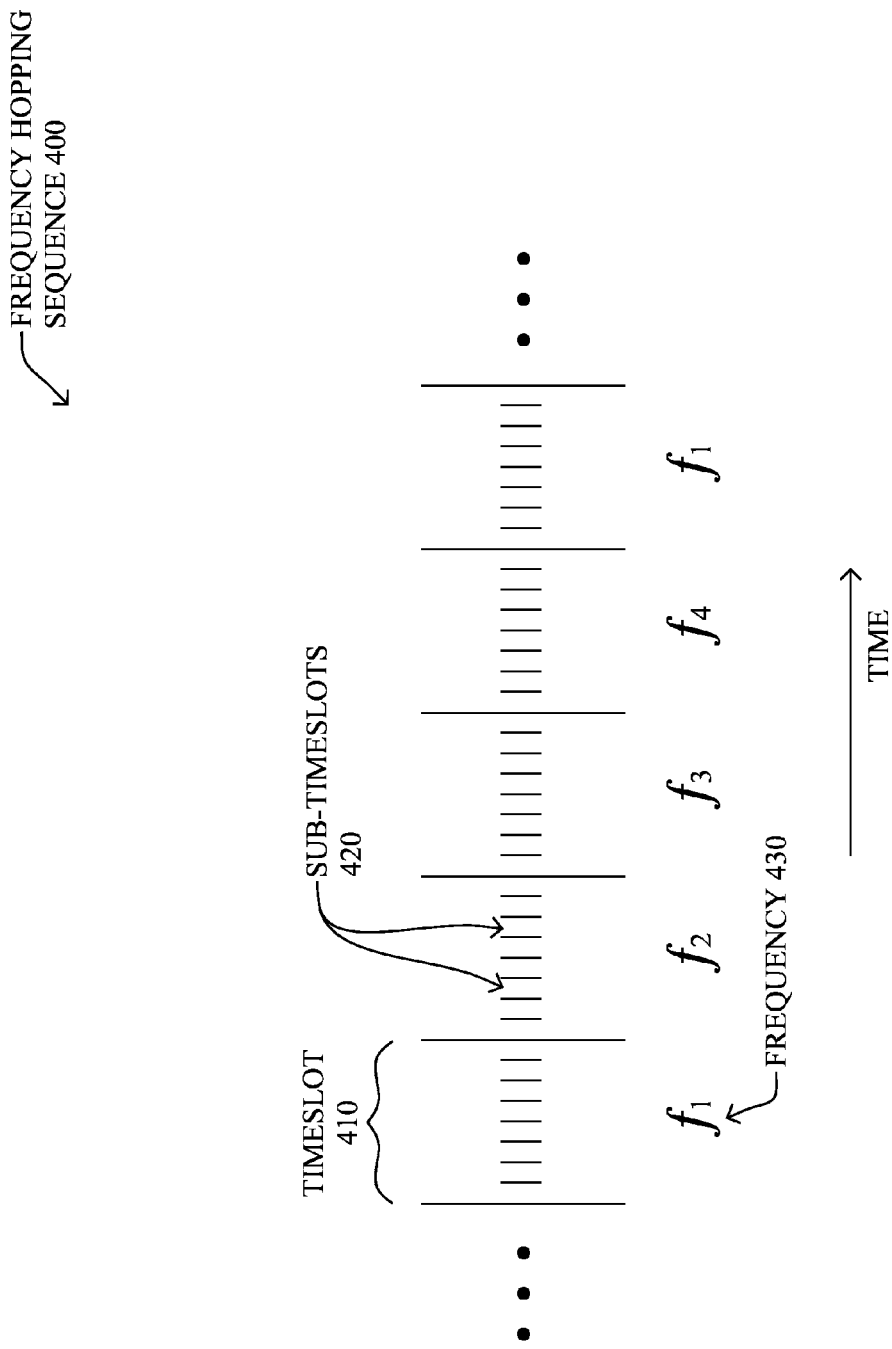
FIGS. 4A-4C illustrate example frequency hopping sequences.

In particular, as shown in FIG. 4A, in frequency-hopping wireless networks, time frames are divided within a frequency-hopping sequence 400 into regular timeslots 410, each one operating on a different frequency 430 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 410 may be further divided into sub-timeslots 420. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

Figure 4B:
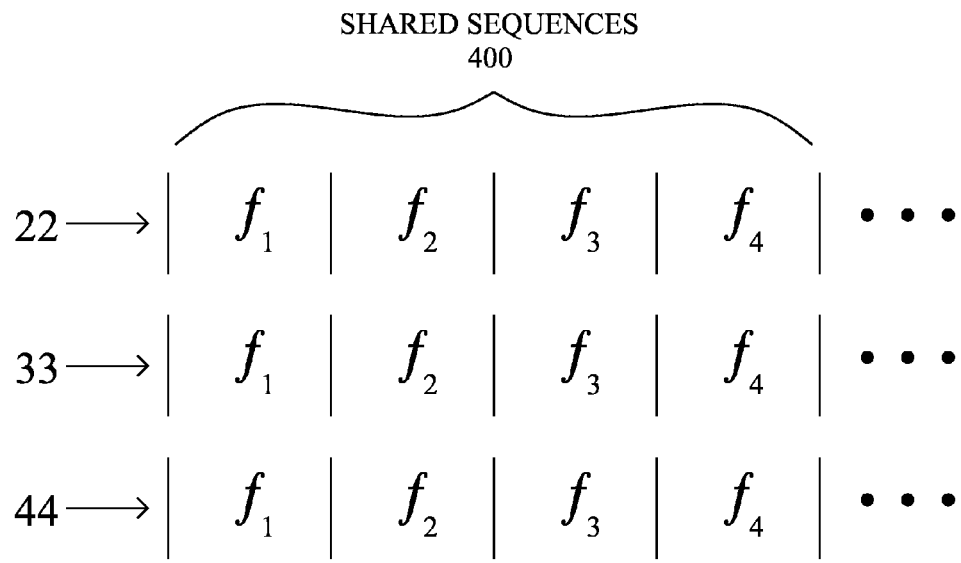

A device in the frequency-hopping network configures its receiver to follow a hopping schedule by picking a channel sequence, duration of each time slot, and time base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel. An example of this is shown in FIG. 4B, in which each receiver (22, 33, and 44) are all configured with the same sequence (assume also that node 11 uses the same sequence).

Figure 4C:
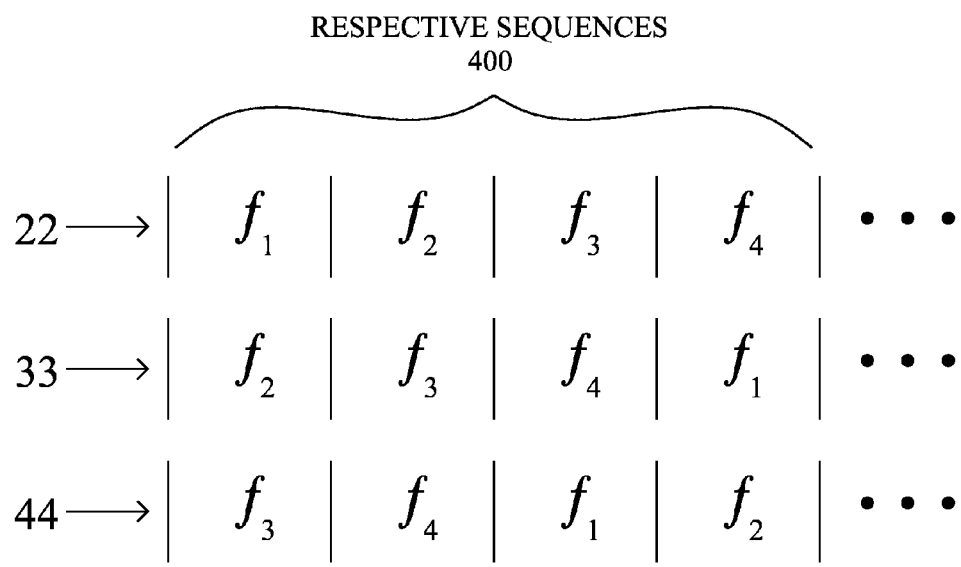

Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel hopping network may individually pick their own hopping schedule parameters independent of any other node, as is shown in FIG. 4C. Note that the offset of the frequencies (i.e., the fact that the same four frequencies are used in the same order, just offset by one timeslot) is merely one illustration, and the sequences and frequencies can be independently chosen. Also, note that while timeslots are shown as being synchronized between different nodes, those skilled in the art will appreciate that timeslots between different nodes can, in fact, be out-of-phase, and may have no relationship with each other.

A device synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

As noted above, frequency/channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering.

Mesh networks typically utilize both unicast and broadcast communication. Applications use unicast communication to communicate data to a central server (e.g., AMI meter reads) or configure individual devices from a central server (e.g., AMI meter read schedules). Network control protocols use unicast communication to estimate the quality of a link (e.g., RSSI and ETX), request configuration information (e.g., DHCPv6), and propagate routing information (e.g., RPL DAO messages).

Applications use multicast communication for configuring entire groups efficiently (e.g., AMI meter configurations based on meter type), firmware download to upgrade (e.g., to upgrade AMI meter software to a newer version), and power outage notification. Network control protocols use multicast communication to discover neighbors (e.g., RPL DIO messages, DHCPv6 advertisements, and IPv6 Neighbor Solicitations) and disseminate routing information (e.g., RPL DIO messages).

Existing systems optimize for both unicast and broadcast communication by synchronizing the entire network to the same channel-switching schedule and using a central coordinator to compute and configure channel schedules for each individual device. For example, a first channel-hopping network may schedule all nodes to receive on the same channel at the same time, and the entire network hops together in lock-step. While this first network is optimized for broadcast, it does not allow frequency diversity for unicast where different pairs of nodes may communicate at the same time on different channels. In a second example network, both unicast and broadcast slots may be utilized, where a central gateway device computes the hopping schedule for each transmitter-receiver pair. However, this method adds significant delay and communication overhead to coordinate new schedules between each transmitter-receiver pair as the schedules are distributed using the wireless network. Each of these two example networks fail to optimize the schedule for both unicast and broadcast communication without the need for centrally computing schedules for individual nodes.

Optimizing Unicast and Broadcast Schedules

An illustrative channel-hopping concept is now described that allows each device to determine its own listening schedule for unicast communication while synchronizing the entire network to a common schedule for broadcast communication. That is, the illustrative technique allows different transmitter-receiver pairs to utilize different parts of the spectrum simultaneously for unicast communication but also synchronizes nodes to a network-wide broadcast schedule to support efficient broadcast communication.

Specifically, according to the illustrative technique, each device in a frequency hopping communication network independently determines its own local unicast listening schedule, and discovers a neighbor unicast listening schedule for each of its neighbors. The devices also synchronize to a common broadcast schedule for the network that simultaneously overlays a configured portion of all unicast listening schedules in the network. Accordingly, the device operate in a receive mode according to their local unicast listening schedule and the common broadcast schedule during the overlaid configured portion, and in a transmit mode according to each neighbor unicast listening schedule and the common broadcast schedule during the overlaid configured portion depending upon a destination of transmitted traffic.

Illustratively, this technique, as well as the extensions to this technique described below, may be performed by hardware, software, and/or firmware, such as in accordance with scheduling process 247 and/or MAC layer module 212 (247a), which may each contain computer executable instructions executed by a processor (e.g., processor 220 or an independent processor within the network interface 210) to perform functions relating to the novel techniques described herein, such as, e.g., as part of a frequency hopping communication protocol. For example, the techniques herein may be treated as extensions to conventional wireless communication protocols, such as the IEEE 802.11 protocol, IEEE 802.15.4, WiFi, etc., and as such, would be processed by similar components understood in the art that execute such protocols, accordingly.

This illustrative technique is generally premised on the following factors, as will be described in further detail below:
1) Having each device determine its own unicast schedule independent of all other devices,
2) Synchronizing the network to a common broadcast schedule that also indicates when devices listen for broadcast transmissions instead of unicast transmissions,
3) Transmitting unicast messages according to the listening schedules determined by the receiver, and
4) Transmitting broadcast messages according to the broadcast schedule.

Operationally, each node maintains its own channel-hopping schedule for receiving unicast messages, thus independently determining a "local unicast listening schedule" for each device. A unicast schedule is defined by the following parameters:
1) Channel Sequence: a list of channels, e.g., indexed by a 16-bit integer, that a mesh interface follows when listening for unicast transmissions. Each entry in the Channel Sequence may be determined by a function that is based on a unique identifier of the device, e.g., the interface's MAC address, and the list index. Using the MAC address helps ensure that neighboring nodes do not follow the same pseudo-random sequence and reduces the chance of repeated collisions by neighboring transmitter-receiver pairs.

2) Slot Duration: the unicast schedule divides time into equal sized slots. A node listens to a single channel for the entire duration of a slot. At the beginning of each slot, the node switches to the next channel in the unicast schedule for listening. Note that as mentioned above, each independently determined unicast listening schedule can be independently timed, i.e., the slots (timeslots, sub-timeslots, etc.) need not align between different devices schedules.

FIG. 5 illustrates another example of independently determined local unicast listening schedules 400 that may be computed by each individual device in the network 100. Note how there is generally no overlap at any given time (a goal of the scheduling algorithm, but not a necessity), and that certain frequencies may be re-used at different times. Note also that contrary to FIG. 4B, the schedules are completely independent, that is, they are not simply an offset of the same order, and the slots do not generally line up between the devices.

A transmitter must learn and synchronize with a receiver's channel-hopping schedule to successfully transmit unicast messages to it. Accordingly, each device may share their local unicast listening schedule with its neighbors, such that each device can correspondingly discovering a neighbor unicast listening schedule for each neighbor, accordingly. As mentioned above, a node includes information about its unicast schedule in various link frames (packets 140) to allow neighboring nodes to synchronize to its unicast schedule. The information may generally include the phase information, i.e., the amount of time that has elapsed between a "Start-of-Frame" transmission and the start of the current unicast timeslot, and slot information, i.e., the slot number during which the Start-of-Frame was transmitted.

Having each receiver maintain its own channel-hopping schedule increases overall throughput of the network since different transmitter-receiver pairs can use multiple channels simultaneously. Requiring each transmitter to synchronize with each receiver independently increases overall robustness, since any synchronization errors will be localized to the affected transmitter-receiver pair.

According to the illustrative technique, in addition to the unicast listening schedules, all nodes in the same network synchronize to a common broadcast schedule that simultaneously overlays a configured portion of all unicast listening schedules in the network. Note that there is generally no coordination of broadcast schedules between different networks. A broadcast schedule is defined by the following parameters:

1) Channel Sequence: a list of channels, e.g., indexed by a 16-bit integer, that a mesh interface follows when listening for broadcast transmissions. Each entry in the Channel Sequence may be determined by a function that takes a unique identifier of the network (e.g., an IEEE 802.15.4 personal area network or "PAN" ID) and the list index. Using the network ID helps ensure that neighboring networks (e.g., PANs) do not follow the same pseudo-random sequence and reduces the chance of repeated collisions by neighboring networks.

2) Slot Duration: the broadcast schedule divides time into equal sized slots. At the beginning of each slot, the node switches to the next channel in the broadcast schedule for listening.

Figure 6:
FIG. 6 illustrates an example broadcast frequency hopping sequence.

FIG. 6 illustrates an example broadcast schedule (sequence) 600, showing example frequencies $B_1$-$B_6$. All nodes in the network synchronize to only one broadcast schedule. The slot timing of broadcast slots in the common broadcast schedule may generally be independent of slot timing of unicast slots in the local unicast listening schedule. Note that while the broadcast schedule 600 is shown with a frequency or channel designated in each timeslot (from which particular portions are selected for use), the techniques herein may also simply populate the schedule with those broadcast slots that are to be used (e.g., only $B_3$ and $B_6$, as shown below). The broadcast schedule may be established by a single root node and distributed to all other nodes using any standard dissemination protocol (e.g., simple flood, Trickle-based dissemination, etc.). Note that the dissemination protocol may utilize unsynchronized transmissions, particularly where no schedule has yet been established. The root node may be administratively assigned (e.g., an IEEE 802.15.4 PAN coordinator, Field Area Router, etc.) or automatically discovered (e.g., a smallest IEEE 802.15.4 IEEE EUI-64).

In addition, a broadcast schedule is also defined by the following parameters:

3A) Broadcast Window: specifies how long a node listens for broadcast messages within a broadcast slot. FIG. 7A illustrates an example of broadcast windows 710, during which the common broadcast schedule is to be used (a configured portion overlaying the unicast schedules). Broadcast windows may be found in only specific timeslots as shown, or else may be the initial portion (e.g., one or more sub-timeslots) of every timeslot of the sequence. Broadcast packets must start their transmission within the Broadcast Window to ensure that all neighboring nodes are listening for the broadcast transmission. The Broadcast Window must specify a time that is no greater than the Slot Duration. At the beginning of each designated broadcast slot, the node switches to the next channel in the broadcast schedule to listen for broadcast transmissions. At the end of the Broadcast Window, the node returns to listening for unicast transmissions until the start of the next broadcast slot. The unicast schedule is free running and the timing remains unaffected by the broadcast schedule. In other words, the broadcast schedule is overlaid on a node's unicast schedule. Note that in one embodiment, the Broadcast Window may utilize one or more sub-timeslots starting at different offsets within each broadcast slot. For example, the Broadcast Window may start on sub-slot X in slot 1, Y in slot 2, Z in slot 3, etc. The sub-slot start time may be specified as part of the broadcast channel sequence, where each slot indicates not only channel but sub-slot offset.

3B) Active Slot Period (instead of or in addition to a Broadcast Window): specifies which slots within a broadcast schedule are used to listen for broadcast transmissions. For example, an Active Slot Period of 10 would indicate that the node listens for broadcast communication every tenth slot of the broadcast schedule. During the other 9 out of 10 slots, the device follows its own unicast schedule and listens for unicast communication. FIG. 7B illustrates an example of an active slot period, e.g., of 3, where every third slot of the common broadcast schedule is a time during which the common broadcast schedule is to be used (e.g., corresponding to $B_3$ and $B_6$).

Notably, the configured portion of the common broadcast schedule that is used to overlap the unicast schedules, e.g., the Broadcast Window size and/or Active Slot Period, can be adjusted to configure the amount of time that a network spends listening for broadcast traffic rather than unicast traffic, as described in greater detail below.

According to the illustrative technique, the common broadcast schedule 600 overlays each individual device's unicast listening schedule 400, such that the devices operate in a receive mode (listening for transmissions) according to the local unicast listening schedule and the common broadcast schedule during the overlaid configured portion, and operate in a transmit mode according to each neighbor unicast listening schedule and the common broadcast schedule during the overlaid configured portion depending upon a destination of transmitted traffic.

For example, FIG. 8 illustrates the overlay of the broadcast schedule 600 over the unicast listening schedules 400 of each device in the network. For instance, as can be seen, node 11 listens to its local unicast listening schedule unless the particular overlaid portion of the broadcast schedule dictates that node 11 listen on the broadcast channel at the time. Should node 11 wish to send a transmission to any of its neighbor nodes (22-44), node 11 uses the neighbor's listening schedule according to whether a unicast message or broadcast message is to be used. Note that in FIG. 8, the left side shows an active broadcast slot period 720, while the right side shows a broadcast window 710, though this is merely for illustration. Note further that a combination of slot period 720 and broadcast window 710 may be used, e.g., defining which particular slots of a broadcast schedule to use (period 720), and then further defining a length of time for each of those slots to use (window 710).

In particular, all unicast link frames are thus sent using the receiver's (neighbor's) unicast schedule. The link layer maintains a table for neighboring receivers that includes information about the receivers' schedules. If the intended receiver is not resident in the neighbor table, then the message is passed back to higher layers with an error condition. Otherwise, the transmitter determines the appropriate channel given the current time and begins transmission, i.e., transmitting a unicast message to a particular neighbor during a unicast slot based on the corresponding neighbor unicast listening schedule for the particular neighbor.

Also, all broadcast link frames are thus also sent using the network's broadcast schedule. The link layer maintains information about the broadcast schedule. If the broadcast schedule is unknown, the message is passed back to higher layers with an error condition. Otherwise, the transmitter wait until the next broadcast window, selects the appropriate channel, and begins transmission at that time, i.e., transmitting a broadcast message into the network during a broadcast slot based on the common broadcast schedule.

Separating unicast and broadcast traffic is beneficial in cases where broadcast traffic is used for critical network control or application functions. However, the network may optionally be configured to allow transmission of unicast frames during a broadcast slot while the network is actively listening for broadcast transmissions. Doing so reduces communication delays and aggregate capacity for unicast traffic, but comes at the risk of interfering with broadcast traffic.

A synchronized transmission starts within the intended unicast or broadcast slot but does not need to end within the same slot. That is, a link frame transmission only utilizes a single channel and link frames are not fragmented across different channels. Once a node begins receiving a link frame, it will continue receiving the frame until the end of transmission.

Note further that synchronized transmissions should take into account any of the uncertainties in time synchronization. Such uncertainties may be due to frequency tolerances of nodes' clock sources and interrupt processing jitter when time stamping events. To account for these uncertainties, nodes do not begin transmissions near the start or end of a unicast slot or a broadcast listen window. Instead, nodes may schedule their transmissions outside of such guard windows.

Additionally, unicast transmissions typically request an acknowledgment. Acknowledgment frames may thus be sent using the same channel as the received frame being acknowledged. Utilizing the same channel for sending the acknowledgment removes the channel switch overhead on both the transmitter and receiver. Because acknowledgment frames are transmitted without a clear-channel assessment, the acknowledgment transmission may continue to use the same channel originally acquired by the frame being acknowledged.

Figure 9:
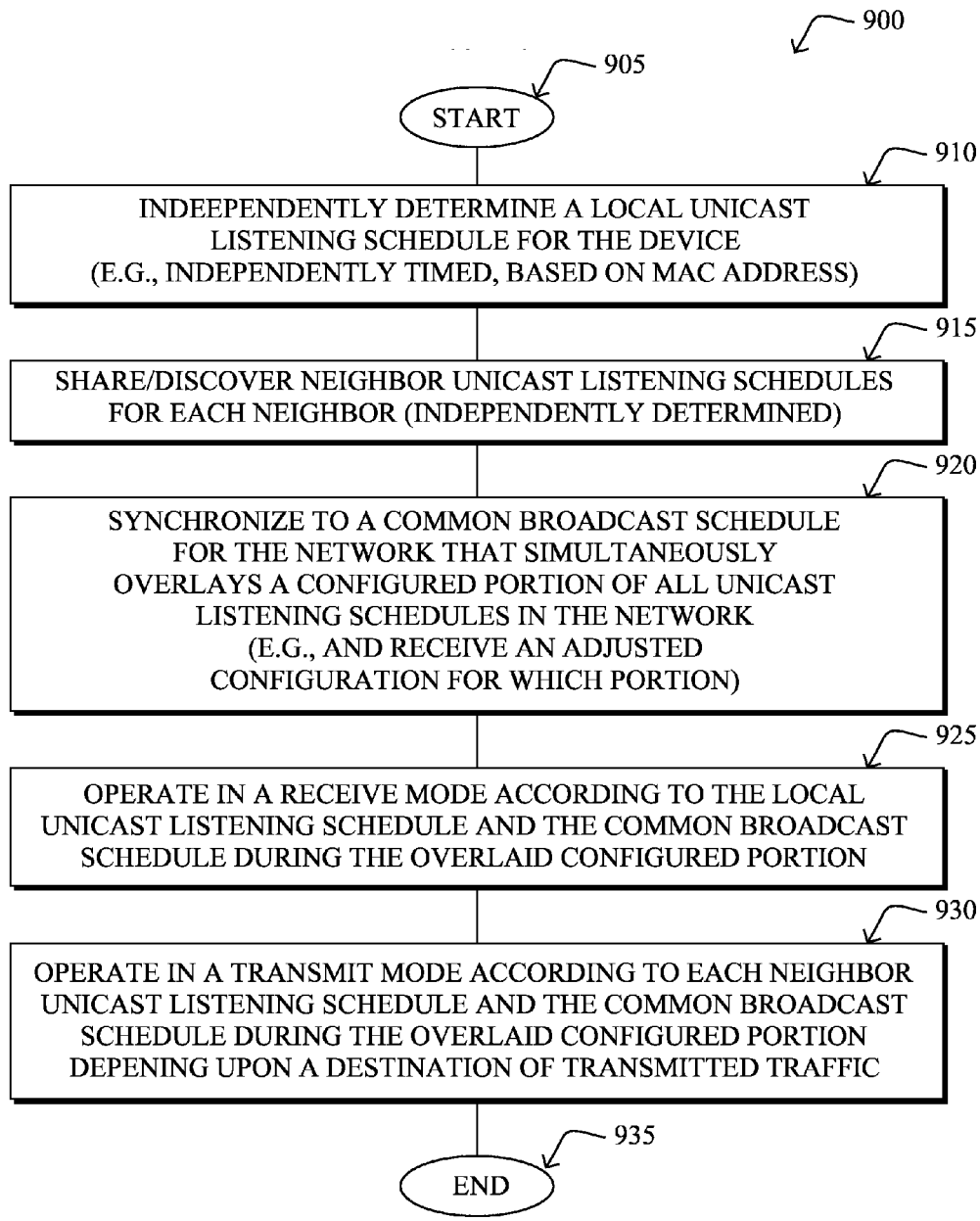
FIG. 9 illustrates an example simplified procedure for providing optimized unicast and broadcast schedules in frequency hopping computer networks, e.g., overlaying the common broadcast schedule over the independent unicast schedules.

FIG. 9 illustrates an example simplified procedure for providing optimized unicast and broadcast schedules in frequency hopping computer networks in accordance with the illustrative technique described above, e.g., overlaying the common broadcast schedule over the independent unicast schedules. The procedure 900 starts at step 905, and continues to step 910, where, as described in detail above, a device independently determines its local unicast listening schedule (sequence 400). For example, as mentioned above, the local unicast listening schedule can be independently timed (where the slots don't need to line up with neighbors' slots), and may be based on a MAC address or other unique ID of the device to avoid overlap with other nearby devices. In step 915, the neighbor unicast listening schedules for each neighbor (independently determined) may be shared to and discovered from the device's neighbors. Further, in step 920, the device synchronizes to a common broadcast schedule 600 for the network that simultaneously overlays a configured portion of all unicast listening schedules in the network, e.g., as shown above in FIG. 8. Note that as described above, the actual broadcast portions may be adjusted through received configurations, such as to extend or reduce a broadcast window, increase or decrease a number of broadcast slots, etc.

In step 925, the device operates in a receive mode according to the local unicast listening schedule and the common broadcast schedule during the overlaid configured portion, as described in detail above. For instance, the device listens to the network for unicast traffic based on its local unicast listening schedule, unless it is during a portion of the schedule that is overlaid by the broadcast schedule, at which time the device listens for broadcast traffic. Also, for any transmissions to be sent from the device, in step 930 the device may correspondingly operate in a transmit mode. The transmit mode operates according to each neighbor unicast listening schedule and the common broadcast schedule during the overlaid configured portion depending upon a destination of transmitted traffic. As illustrated above, for instance, if node 11 is to transmit a unicast packet to node 22, node 11 determines the appropriate frequency/channel based on node 22's neighbor listening schedule at the time the transmission is to occur, and then transmits the unicast packet, accordingly. If node 11 has a broadcast packet to transmit, then it may wait (if necessary) for a next broadcast window/slot, and transmits the broadcast packet at the specified broadcast frequency.

The procedure 900 ends in step 935, notably with the ability to update unicast and/or broadcast schedules, to receive messages, and/or to transmit messages in any of the corresponding steps outlined above. It should also be noted that certain steps within procedure 900 may be optional, and the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the illustrative technique.

This illustrative technique described above, therefore, provides for optimized unicast and broadcast schedules in a frequency hopping network. By overlaying independent unicast schedules with a common broadcast schedule, a system in accordance with the illustrative technique:

1) Increases aggregate network capacity for unicast communication by utilizing independent channel-hopping schedules.
2) Reduces the likelihood of repeated unicast collisions between neighboring transmitter-receiver pairs by using a pseudo-random function that takes the MAC address as a parameter.
3) Increases efficiency of broadcast communication by synchronizing all nodes to a common broadcast schedule.
4) Reduces the likelihood of repeated broadcast collisions between neighboring networks by using a pseudo-random function that takes the network ID as a parameter.
5) Optionally allows unicast traffic during broadcast slots to increase aggregate unicast capacity at the cost of increased collisions with broadcast traffic.
6) Allows devices to maintain their own unicast schedule independent of other devices and the broadcast schedule, leading to simpler configuration and management.
7) Allows the broadcast schedule to be maintained independently of the unicast schedule, allowing the broadcast schedule to be reconfigured for changes in the distribution between unicast and broadcast communication.
8) Allows each transmitter-receiver pair to maintain their own synchronization independently, limiting the scope of any synchronization errors to the transmitter-receiver pair.

Power Outage Notification Collection

As noted above, because devices in a computer network (e.g., mesh network) may rely on a small source of stored energy (e.g., batteries or a capacitor) during a power outage of a main power supply, only a limited lifespan of the backup power (e.g., battery or capacitor) may be used to transmit information. In particular, the Advanced Metering Infrastructure (AMI) application requires devices to communicate a Power Outage Notification (PON) when main-power is no longer available. Specifically, for Smart Grid AMI applications, handling power outage scenarios reliably and effectively is a challenging problem. Existing mesh-networking solutions that support AMI applications provide some capability to report power outage events. For example, devices may broadcast a PON or "Last Gasp" message in hopes of communicating the event to a neighboring device that is still powered.

Certain residential meters today currently store enough energy to allow for 30 seconds of uptime and 3 packet transmissions. Since a device does not know what neighbors are affected by the power outage event, it broadcasts the PON three times within the 30-second window. However, because a large number of spatially correlated devices may be affected by a single power outage event, significant congestion can occur due to PON transmissions. Note also that in the hybrid channel-hopping scheme mentioned above, through providing its own advantages as noted, the congestion of PONs may be exacerbated by only allowing broadcast communication for a faction of time. Typically, in a "normal" communication mode, unicast traffic is generally the dominant traffic profile, while power outage events, though rare and unpredictable, generally rely on broadcast communication for power outage notification.

The techniques described herein, therefore, provide a system and method that can allow devices to dynamically transition between the "normal" mode and a mode that listens primarily for PONs when necessary so that they can be received with high reliability. That is, the techniques herein are primarily concerned with the first-hop problem of the Power Outage Notification process, i.e., how a device experiencing a power outage event reliably communicates its state to neighboring devices that may still be powered.

Specifically, according to one more embodiments herein described in greater detail below, a device (e.g., and all other devices, generally) in a frequency hopping communication network operate in a first mode according to a common broadcast schedule for the network that simultaneously overlays a first configured portion of all independently determined unicast listening schedules in the network. In response to determining a power outage condition, the device switches to operation in a power outage mode where the common broadcast schedule for the network in the power outage mode simultaneously overlays a second configured portion of all independently determined unicast listening schedules in the network, the second configured portion greater than the first configured portion. In one embodiment, the device broadcasts one or more power outage notifications (PONs) in response to determining the power outage condition as a reduction of a main power supply at the device. In another embodiment, the device receives a PON while powered as the power outage condition, and switches from the first mode to the power outage mode in response to the received PON.

Illustratively, the techniques described herein may be performed by hardware, software, and/or firmware, such as in accordance with mode selection process 248 and/or MAC layer module 212 (248a), which may each contain computer executable instructions executed by a processor (e.g., processor 220 or an independent processor within the network interface 210) to perform functions relating to the novel techniques described herein, such as, e.g., as part of a frequency hopping communication protocol, and, e.g., in conjunction with scheduling process 247/247a above. For example, the techniques herein may be treated as extensions to conventional wireless communication protocols, such as the 802.11 protocol, WiFi, etc., and as such, would be processed by similar components understood in the art that execute such protocols, accordingly.

Operationally, the techniques herein dynamically adjust the amount of time the network is allocated for broadcast traffic versus unicast traffic based on power outage state. In particular, a system in accordance with the techniques herein allow for quickly switching into a temporary mode optimized for communicating PON messages. The resulting system allows the use of a channel-hopping mode optimized for unicast traffic the majority of the time, but can switch into a channel-hopping mode optimized for broadcast/multicast traffic to support power outage notifications (PONs). As described in detail below, this may be illustratively achieved based on:

1) Using the initial PON transmissions as an indicator to switch into a mode where devices increase the active time of the broadcast schedule;
2) Power outage devices optionally spreading the remaining PON transmissions across the increased active time of the broadcast schedule to reduce congestion;
3) Powered devices in Power Outage Mode optionally transmitting a notification to other neighboring powered devices of their state transition;
4) Powered devices optionally utilizing a tone to confirm their mode switch to power outage devices;
5) Power outage devices optionally utilizing channel-sampling techniques to reduce the energy cost of listening for the confirmation tone; and 6) Powered devices optionally suspending other traffic to maximize the likelihood of receiving PON messages.

===Broadcast Schedule for Power Outage Notifications===

As described above, to allow unicast schedules 400 and broadcast schedules 600 to co-exist, the broadcast schedule also indicates when it is active. When the broadcast schedule is active, all devices in the network listen on the same broadcast channel specified by the broadcast schedule. When the broadcast schedule is inactive, all devices listen on the channel specified by their own unicast schedule. For instance, as described above, a broadcast schedule may indicate active and inactive portions by specifying time offsets within a slot, or, alternatively, entire slots may be marked as active or inactive. The former approach may be used when slots have a long duration, the latter approach may be used when slots have short duration.

A typical AMI application typically sends much more unicast traffic than broadcast traffic. Under normal operation, the broadcast schedule may only be active for a small fraction of time (e.g., 10% or less). However, when a power outage event does occur, as described herein, the broadcast schedule should be active for a significantly larger fraction of time to effectively increase the channel capacity for broadcast communication.

With respect to listening for broadcast communication, according to the techniques herein, a device may operate in one of two modes depending upon determination of a power outage condition:

1) Normal Mode (or often a "first" mode herein): where the active time for the broadcast schedule is small to provide more capacity for unicast communication.

2) Power Outage Mode: where the active time for the broadcast schedule is large to provide more capacity for broadcast communication (i.e., the configured portion of the underlying unicast schedules 400 that are overlaid with active portions of the broadcast schedule 600 are greater than the overlay during the normal mode).

For example, one illustrative broadcast schedule technique described above supports broadcast communication by synchronizing the entire network. That is, in general, the frequency hopping communication network 100 operates according to a common broadcast schedule 600 for the network that simultaneously overlays a configured portion of all independently determined unicast listening schedules in the network. Specifically, the overlaid configured portion may be based on broadcast schedule parameters consisting of a time spent for broadcast transmissions in each broadcast period and a second time between broadcast periods. In other words, the broadcast schedule dedicates the first X seconds (time spent) of every Y second period (time between periods) for broadcast communication. In this manner, as described above, all nodes start and end an X second broadcast period synchronously and the period between the start of each broadcast period is Y seconds.

The value X/Y thus determines the fraction of time that the network is optimized for broadcast communication. In addition, the value (Y–X)/Y determines the fraction of time the network is optimized for unicast communication. Note also that the value Y determines the worst-case latency for broadcast communication. Nodes may send unicast transmissions during a broadcast period (such as powered devices communicating with other powered devices), and as a result, the value of X and Y has minimal effect on latency for unicast communication (unless prevented from transmitting unicast messages during a broadcast timeslot). However, because all nodes are tuned to listen on the same channel during a broadcast period, the overall network capacity may still be significantly reduced for unicast communication.

Figure 10A:
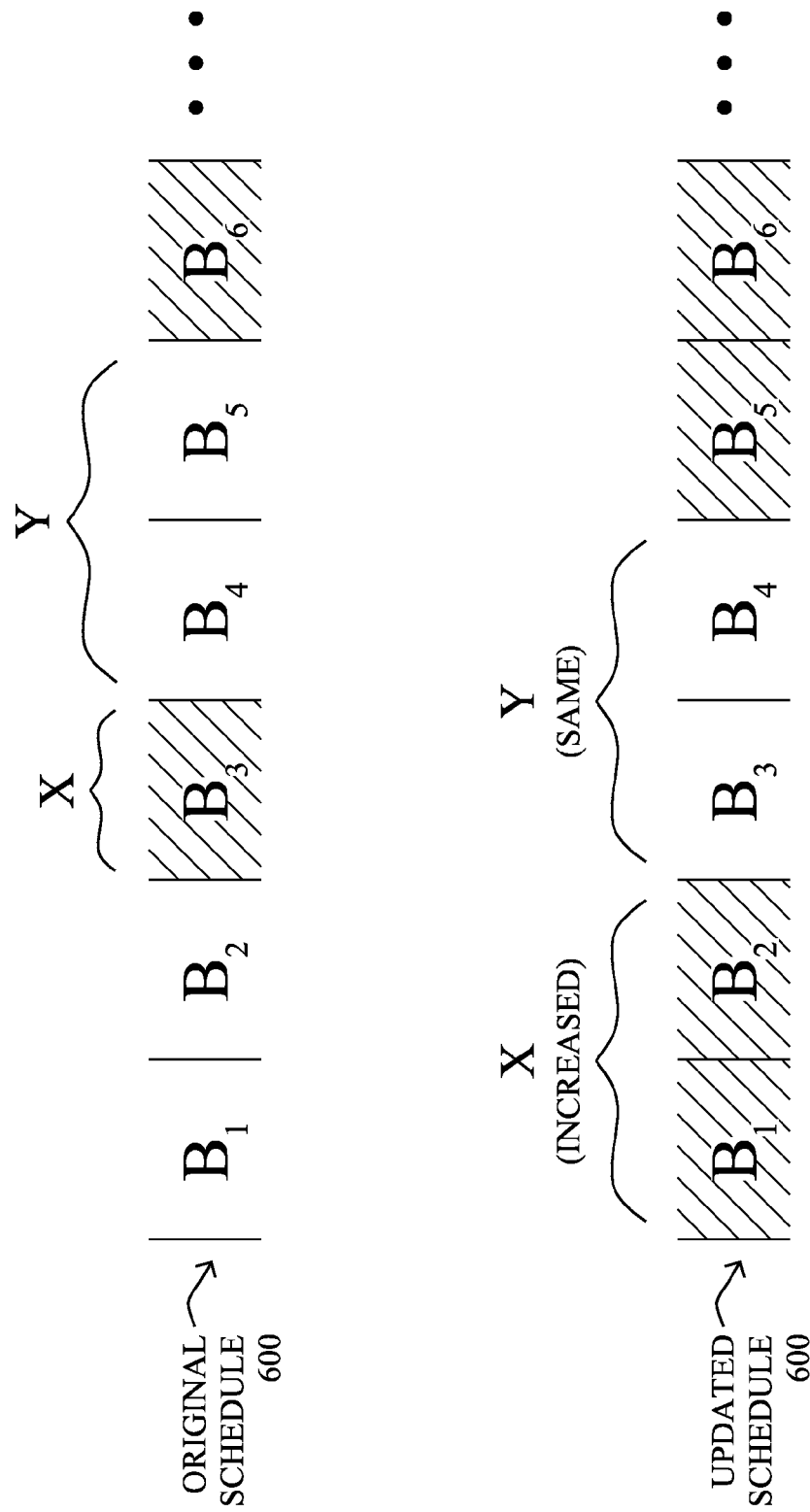
FIGS. 10A-10C illustrate example dynamic broadcast schedule parameters.
Figure 10B:
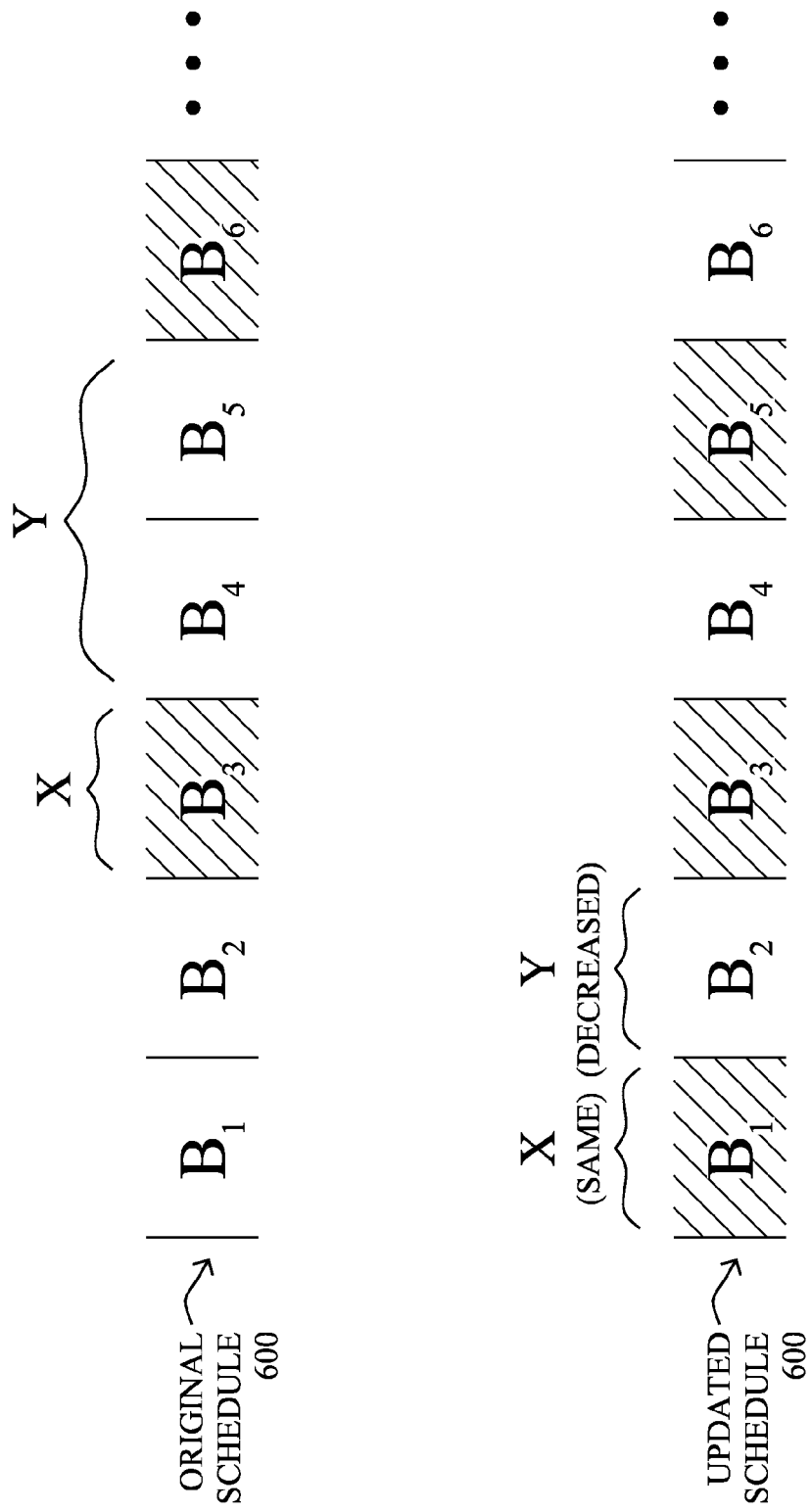
Figure 10C:
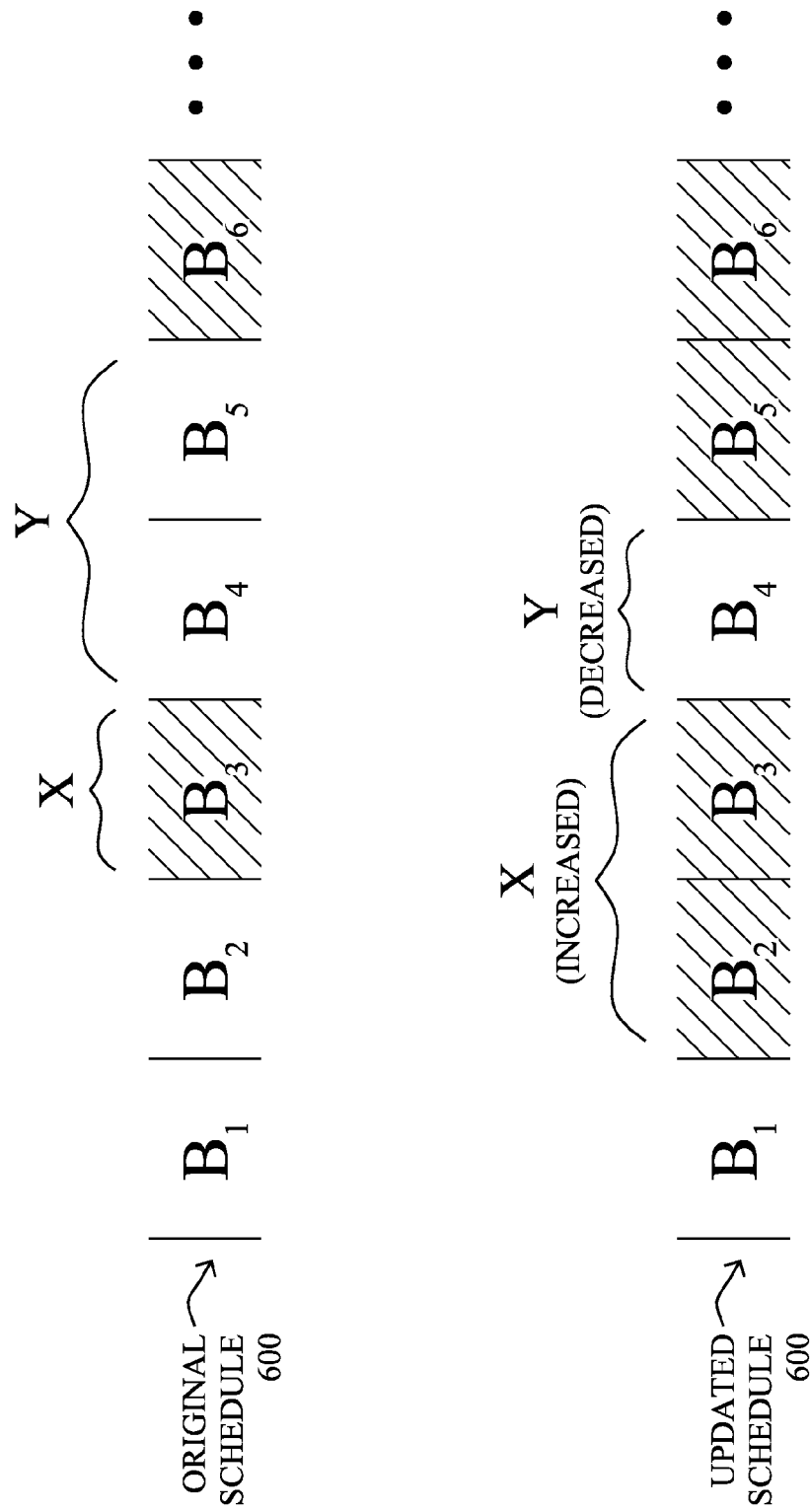
Figure 11:
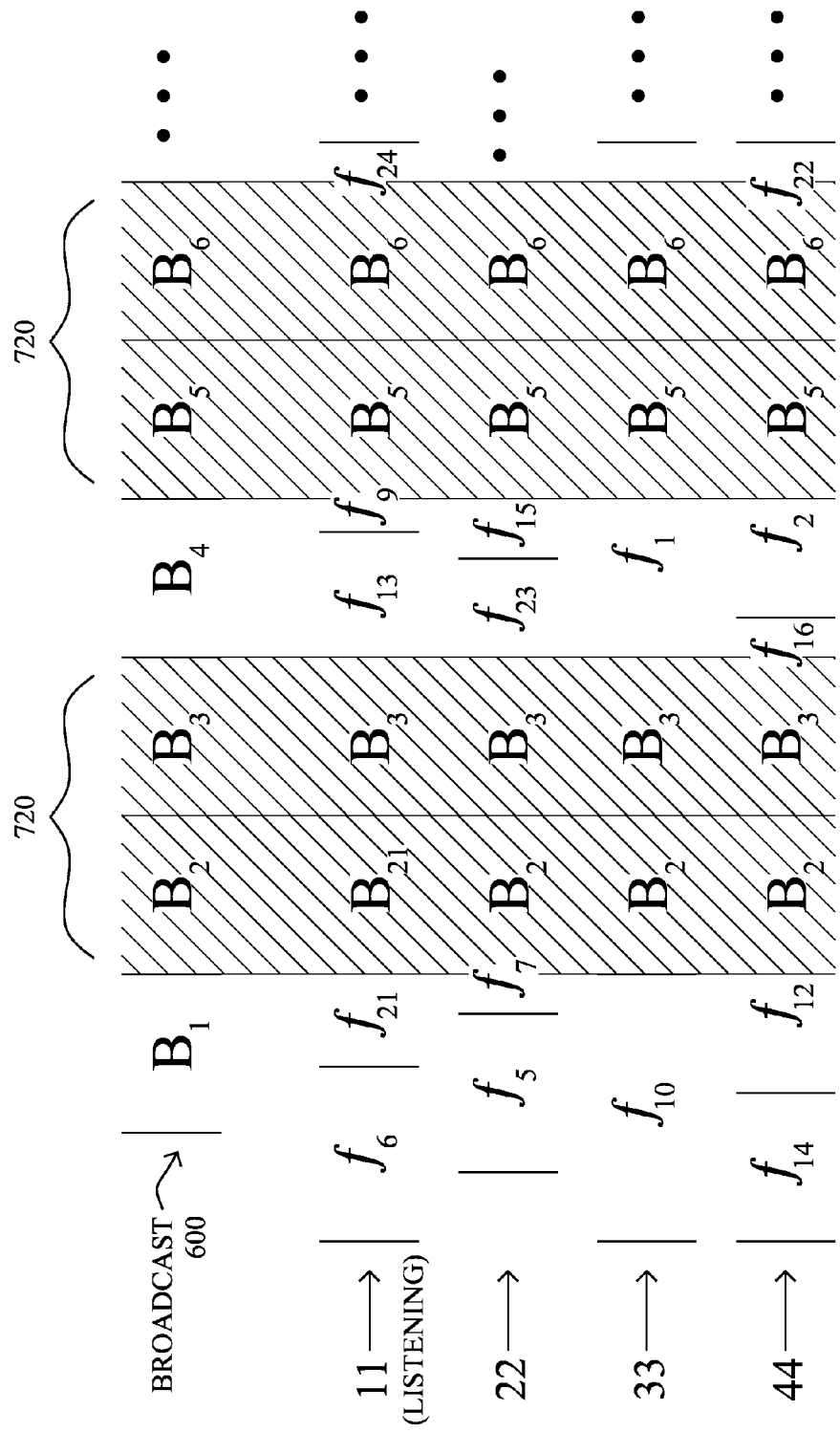
FIG. 11 illustrates an example of the broadcast schedule overlaid on the independent unicast sequences with dynamically adjusted broadcast schedule parameters.

As an example, FIGS. 10A-10C illustrate examples of such updates to the broadcast schedule's parameters. For instance, FIG. 10A illustrates changing (e.g., increasing) X, while maintaining Y. FIG. 10B, on the other hand, illustrates changing (e.g., decreasing) Y, and FIG. 10C illustrates the result of changing both X and Y. Note that X and/or Y may be increased and/or decreased as desired, and the views shown in FIGS. 10A-10C are merely examples for discussion, and are not meant to be limiting to the scope of the embodiments herein. In addition, FIG. 11 illustrates the newly adjusted overlaying broadcast schedule 600, according to the illustrative parameter changes shown in FIG. 10C.

Generally, a centralized management device (e.g., network management service or "NMS") is responsible for determining X (the time spent optimized for broadcast communication per period) and Y (the period between the start of each broadcast period), and distributing that to the nodes of the network 100, or else the configuration may be a hard-coded parameter. In particular, the values of X and/or Y may be distributed to all devices in the network, e.g., using various distributed messages such as a newly defined IEEE 802.15.4 Information Element or Enhanced Beacons, RPL DIO messages, DHCPv6, or application-specific configuration, etc.

Note that changing X while holding Y constant affects the fraction of time the LLN network spends in a state optimized for broadcast communication. Conversely, is changing Y while holding X also affects the fraction of time the LLN network spends in a state optimized for broadcast communication, but also affects the worst-case latency for broadcast communication. Note that X and Y may also both be updated at the same time. Generally, for use herein, a single configuration for X and Y may be established and utilized by the entire network 100, and that decision may be made based on various factors/tradeoffs as determined on a case-by-case basis.

The core of the embodiments described herein is thus to dynamically adjust the values of X and/or Y based on power outage conditions. Note that X and/or Y may also be dynamically adjusted in response to other factors, such as traffic in the network, but according to the techniques herein, the configured portion of overlap (based on X and/or Y) may be changed in accordance with the particular mode of operation. Note further that while adjusting values X and/or Y are an illustrative technique for adjusting the amount of active overlap of the broadcast schedule, for the remainder of the disclosure, the adjustment of X and/or Y, or other suitable techniques for adjusting the time dedicated to a shared broadcast schedule 600, may generally be described in terms of an active time percentage of the broadcast schedule, or else in terms of configured portions (e.g., percentages) of the unicast schedule that is overlaid by active broadcast windows.

According to the techniques herein, for the Power Outage Mode, the broadcast schedule may be 100% active to maximize the channel capacity for broadcast communication. However, doing so disables the use of unicast schedules. In another configuration, the broadcast schedule may be anything less than 100% active, such as 50% active. Doing so would provide greater capacity for broadcast communication while still allowing (reduced) usage of unicast schedules. Note that in general, the key concept herein is that the broadcast schedule during the power outage mode be greater (e.g., substantially) than the broadcast schedule during normal mode. Accordingly, the broadcast schedule in the normal mode may actually range from 0% upward to, e.g., 50%

(where, for example, the broadcast schedule during the power outage mode would thus be 50% or greater).

The particular active time percentage in Power Outage Mode is generally is dependent on the application's requirements for communicating PON messages. For instance, if the reliability of receiving PON messages is more important than latency, then a greater active time (e.g., 100% active time) may be preferred. In this case, powered devices would exclusively listen for PON messages for a period of time before reporting them to a server. Alternatively, if communication latency for receiving PON messages is critical, then allowing for more use of unicast schedules may be desirable. In this case, powered devices would leave some room for unicast schedules so that they can receive and forward PON messages simultaneously. Said differently, the broadcast active time during power outage mode (e.g., a "second configured portion" herein) may be configured based on a tradeoff between relatively higher PON reliability at correspondingly higher lengths of active time/portion versus relatively lower PON latency at correspondingly lower lengths of active time/portion.

===Transmitting Power Outage Notifications===

When devices experience a power outage event, they will transition into a mode dedicated to transmitting PON messages. As such, as shown in FIG. 12, a "reduced-power" device (e.g., node 22) may begin broadcasting one or more power outage notifications (PONs) 1200 in response to determining the power outage condition as a reduction of a main power supply at the device.

The following are parameters that may be determined by the capabilities of the hardware platform:
  W: a device's power lifetime during a power outage event/ condition; and
  T: a number of PON transmissions a device can support during a power outage event/condition.

As an example as noted above, existing hardware allows for W=30 seconds and T=3 transmissions. In addition, the following optional value is a protocol parameter that may be configured:
  B: the first B transmissions that are to be sent when the Normal Mode broadcast schedule is active (as described below). The remaining T-B transmissions may be sent any time the Power Outage Mode broadcast schedule is active.

Figure 12:
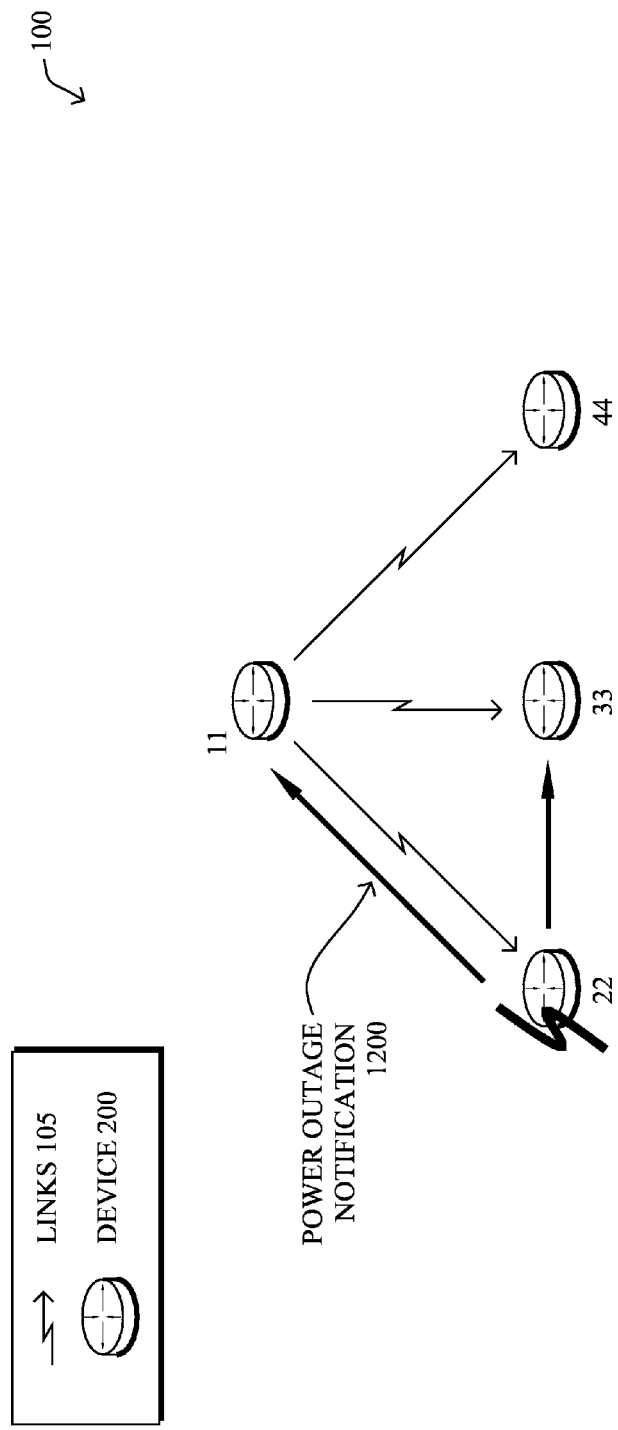
FIG. 12 illustrates an example power outage notification (PON) exchange.

A device that experiences a power outage event, such as node 22 in FIG. 12, substantially immediately enters a Power Outage mode. The sequence of events during this mode is as follows:
  1) Stop listening for messages to conserve energy and maximize lifetime (i.e., ceasing all listening operations on the device during operation in the power outage mode);
  2) Determine one or more transmission windows by dividing the power lifetime by the number of PON transmissions supportable by the device (i.e., dividing W seconds by T to determine transmission windows); and
  3) Broadcast particular PONs within each transmission window.

Illustratively, in one particular embodiment, step 3 may comprise:
  3A) For the first B time windows, choose a random time when the Normal Mode broadcast schedule is active (the "first configured portion" herein) and transmit (broadcast) a PON. These initial messages serve to transition neighboring devices that are powered into the Power Outage Mode.
  3B) For the remaining T-B time windows, choose a random time when the Power Outage Mode broadcast schedule is active (the "second configured portion" herein) and transmit (broadcast) any remaining PONs. These messages are sent assuming that neighboring devices that are powered have already transitioned into the Power Outage Mode.

===Receiving Power Outage Notifications===

A powered device (not experiencing a power outage condition) that receives a PON message 1200 also substantially immediately enters the Power Outage Mode, e.g., node 11. That is, the received PON is the power outage condition for a device that is still main-powered. By switching from the normal mode to the power outage mode, the device simply increases the active time for the broadcast schedule according to the active time chosen for Power Outage Mode as described above (e.g., X and/or Y adjustments). For example, the device 11 may operate according to the broadcast schedule in FIG. 8 during the normal mode, but then may switch to the broadcast schedule in FIG. 11 in response to the received PON 1200 in FIG. 12.

When a device switches into Power Outage Mode, it is possible that neighboring devices will be unaware of the state transition, and thus may not know the actual frequency hopping schedule to properly use when trying to transmit to the powered device in power outage mode, accordingly. For example, node 33 may attempt to transmit a unicast message to node 11 during the timeslot assigned to unicast frequency "$f_3$", as shown in FIG. 8. However, if node 11 is operating according to the power outage mode, then during that same timeframe, node 11 will actually be listening to broadcast frequency "$B_2$".

Figure 13:
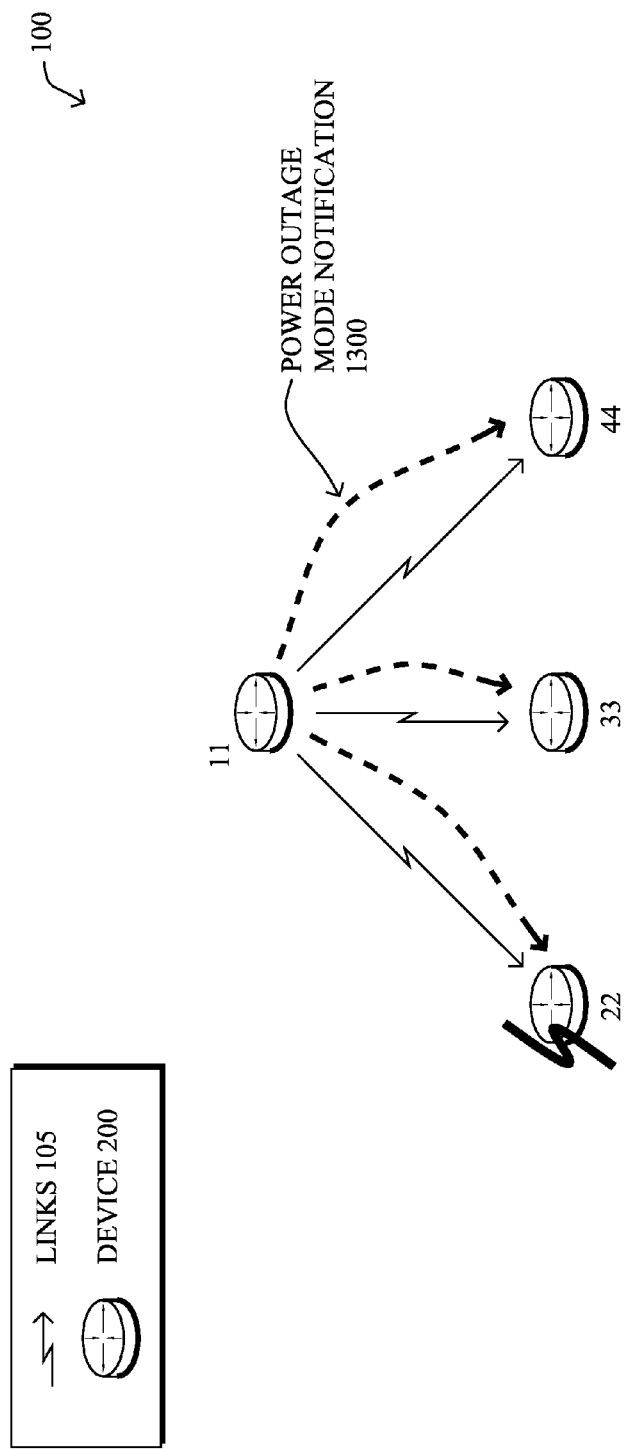
FIG. 13 illustrates an example power outage mode notification exchange.

According to the techniques herein, therefore, the powered device in power outage mode may transmit a notification 1300 as shown in FIG. 13 to its neighboring devices so that they are aware of the state transition. In one embodiment, this may be done using the standard broadcast slots at the risk of causing additional congestion for the initial PON messages. Another alternative is to utilize unsynchronized transmissions, which if performed while the broadcast schedule is inactive will avoid adding congestion. In another embodiment, a device may unicast explicit notifications to neighboring devices individually. In still further embodiments, however, even without the explicit notification 1300, link-estimation and routing mechanisms should be resilient to rare occurrences of neighbors switching to a Power Outage Mode.

===Verifying State Transition of Powered Devices===

In the illustrative system described above, devices experiencing a power outage may send a fixed number, e.g., B, of initial PON messages using the Normal Mode broadcast schedule. A value of B=1 is risky in that if no neighbors receive the initial PON, then no neighbors will transition into the Power Outage Mode. A larger value allocates more PON transmissions to increase the reliability of notifying powered neighbors, but suffers from increased congestion. A more advanced approach is to allow powered devices to give an explicit notification that they are in the Power Outage Mode.

Figure 14:
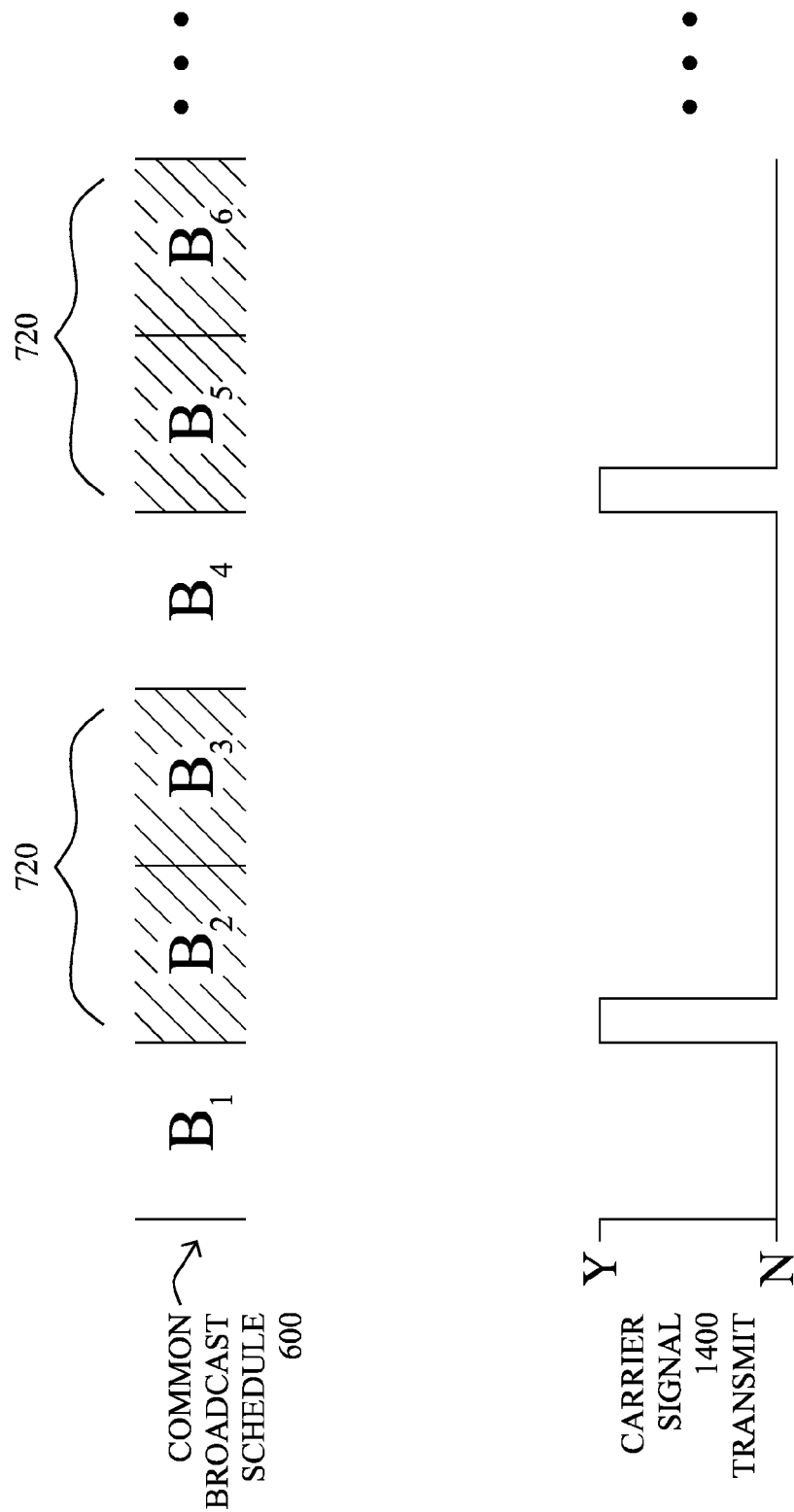
FIG. 14 illustrates an example use of a carrier signal during a power outage mode.

In this approach, as shown in FIG. 14, devices in the Power Outage Mode may transmit a short carrier signal 1400 (e.g., several milliseconds) at some specified time (e.g., the beginning) of each active broadcast period while in Power Outage Mode, to thus indicate that the powered device is listening in the Power Outage Mode. After transmitting the initial PON message, a reduced-power device may listen for the carrier signal during the active broadcast portion of the Power Outage Mode schedule before transmitting subsequent PON messages. In response to determining that a powered neighbor is listening in the power outage mode (based on "hearing" the carrier signal), the reduced-power device may then broadcast remaining PONs according to the Power Outage Mode schedule. On the other hand, if no carrier signal is detected, no neighboring devices have transitioned into the Power Outage Mode yet, and the reduced-power device can continue channel sampling for the carrier signal in case a different device's PON message has flipped neighboring nodes into the Power Outage Mode. If no carrier signal is detected, e.g., within the first W/T seconds, then the reduced-power device may transmit another PON message assuming the Normal Mode broadcast schedule. Note that because the signal is a short carrier, listening for the signal can utilize channel-sampling techniques to minimize to the energy cost of listening for the carrier.

Figure 15:
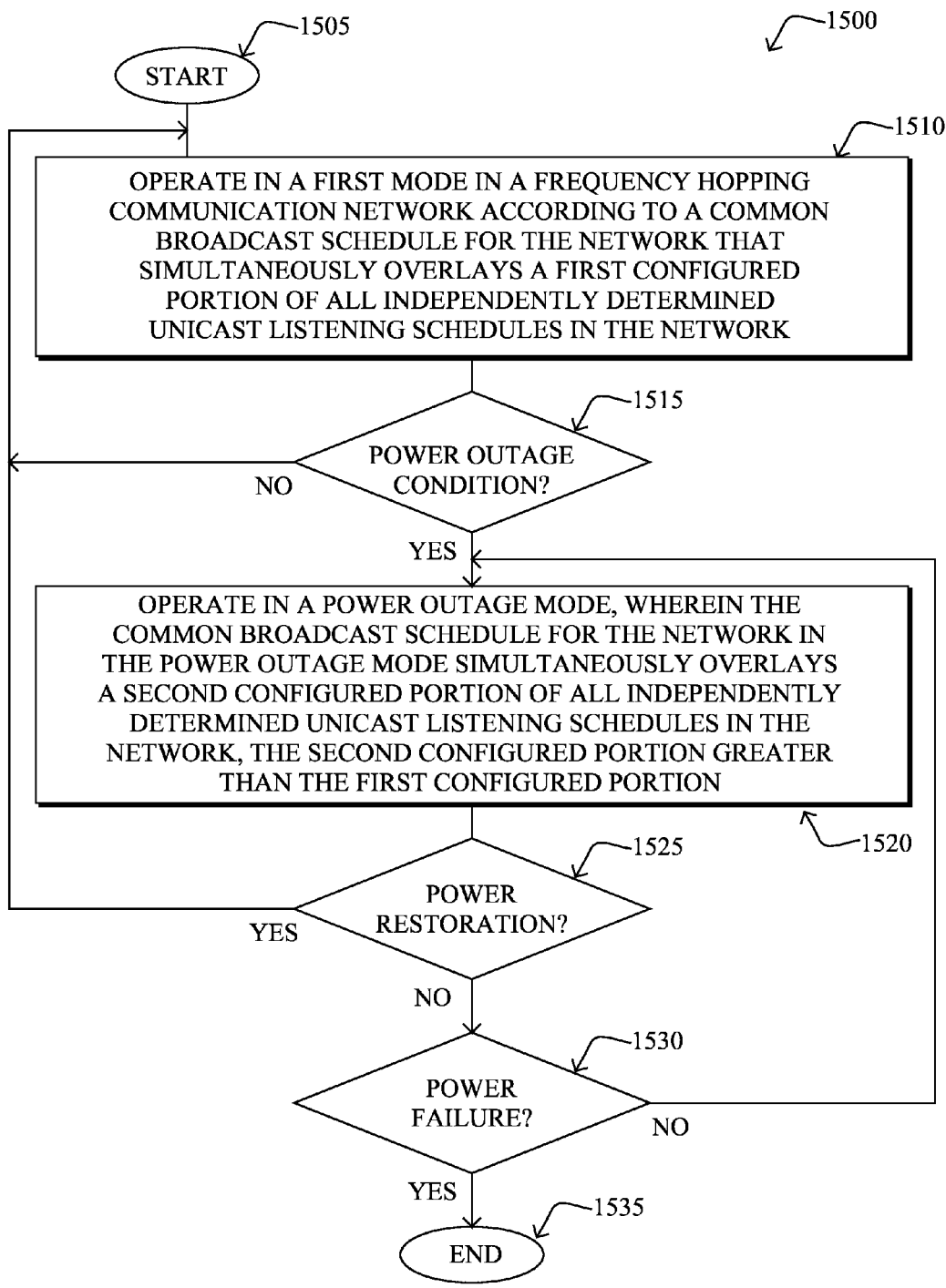
FIG. 15 illustrates an example simplified procedure for providing for efficient PON collection through dynamic use of broadcast schedules in a frequency hopping network, e.g., generically for both the reduced power device and the powered device.

FIG. 15 illustrates an example simplified procedure for providing for efficient PON collection through dynamic use of broadcast schedules in a frequency hopping network in accordance with one or more embodiments described herein, e.g., generically for both the reduced power device and the powered device. The procedure 1500 starts at step 1505, and continues to step 1510, where, as described in detail above, the device operates in a first (e.g., "normal") mode in a frequency hopping communication network according to a common broadcast schedule 600 for the network that simultaneously overlays a first configured portion of all independently determined unicast listening schedules 400 in the network.

In response to a power outage condition in step 1515 (e.g., at the device as in FIG. 16 below, or by receiving a PON 1200 as in FIG. 17 below), the device switches to operate in a power outage mode in step 1520, wherein the common broadcast schedule 600 for the network in the power outage mode simultaneously overlays a second configured portion of all independently determined unicast listening schedules in the network, the second configured portion greater than the first configured portion, as described in greater detail above.

If there is a power restoration event in step 1525, then the procedure 1500 returns to step 1510 to operate in the first mode. Otherwise, the procedure continues to operate in the second mode until a complete power failure (of backup power) in step 1530, when the procedure 1500 illustratively ends in step 1535. Note that where the procedure 1500 is performed by a main-powered device, the end may come when no additional PONs 1200 are received, thus indicating an end to the failing device's backup power supply.

Figure 16:
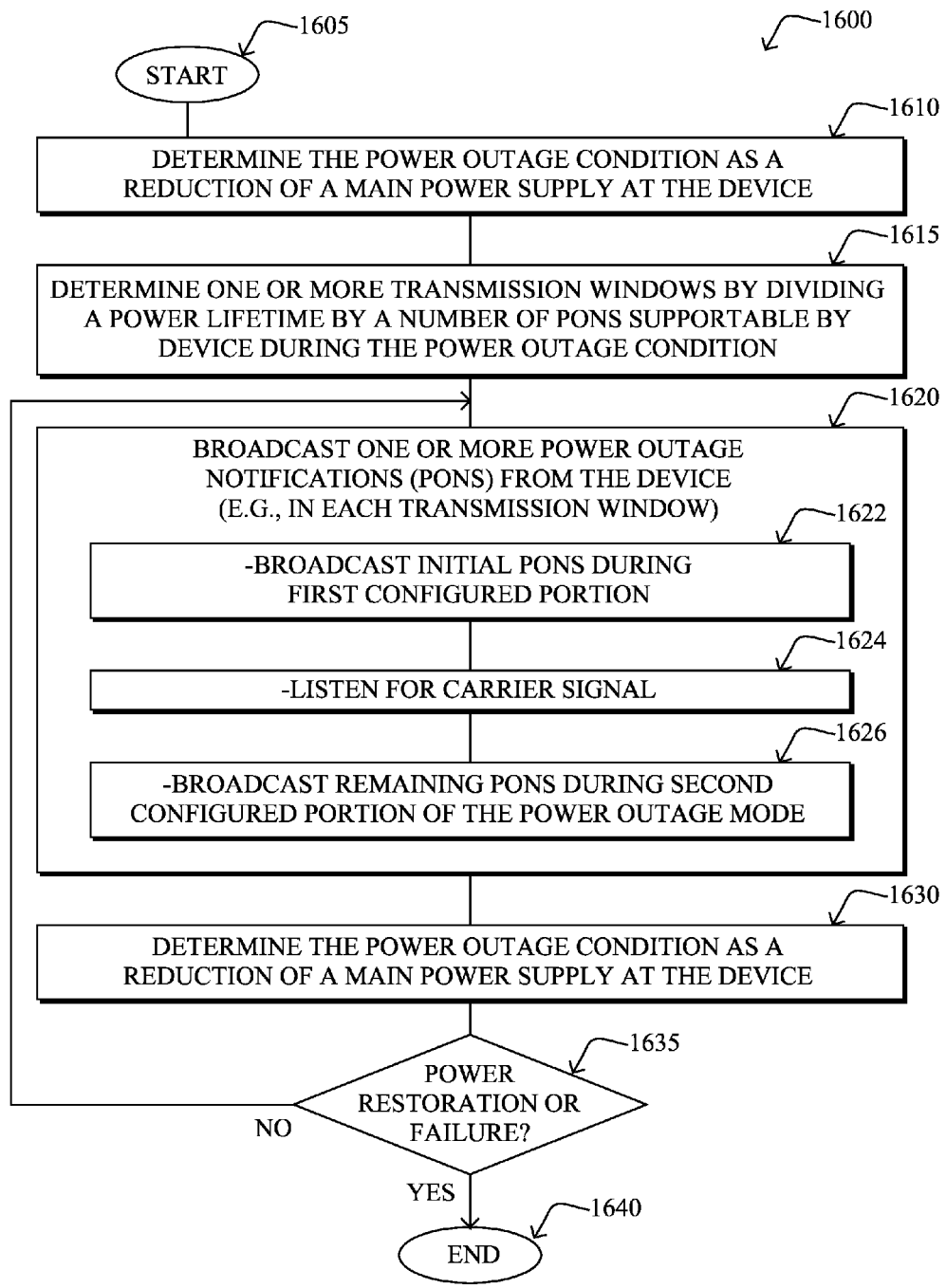
FIG. 16 illustrates an example simplified procedure for providing for efficient PON collection through dynamic use of broadcast schedules in a frequency hopping network, e.g., for the reduced power device.

Additionally, FIG. 16 illustrates an example simplified procedure for providing for efficient PON collection through dynamic use of broadcast schedules in a frequency hopping network in accordance with one or more embodiments described herein, e.g., for the reduced power device. The procedure 1600 starts at step 1605, and continues to step 1610, where, as described in detail above, a particular device (e.g., device 22) determines the power outage condition as a reduction of a main power supply at the device, e.g., an absolute failure or merely a "brownout" condition, etc. In response the reduced-power device may determine one or more transmission windows in step 1615 by dividing a power lifetime by a number of PONs supportable by device during the power outage condition, as noted above.

In step 1620, the device broadcasts one or more PONs 1200 from the device, e.g., in each transmission window, as described in detail herein. For instance, in sub-step 1622, the device may broadcast initial PONs during the first configured portion, and optionally depending upon hearing a carrier signal in step 1624, may then begin broadcasting remaining PONs during second configured portion of the power outage mode in step 1626. In addition, optionally in step 1630, all listening operations may be ceased during operation in the power outage mode. Alternatively, it may be possible to classify received messages and drop messages that are not allowed during a power outage event. That is, it may still be beneficial to route/forward some traffic (packets 300), such as other PONs 1200 from deeper within a power outage area, but because the network is operating with reduced channel capacity, some traffic may need to be dropped to conserve energy or channel capacity. The classes may utilize the DSCP field (e.g., type field 318) in an IP packet.

In response to a power restoration or power failure in step 1635, the procedure 1600 ends in step 1640, e.g., to return to the first/normal mode, or else to simply cease operation (due to complete loss of all power).

Figure 17:
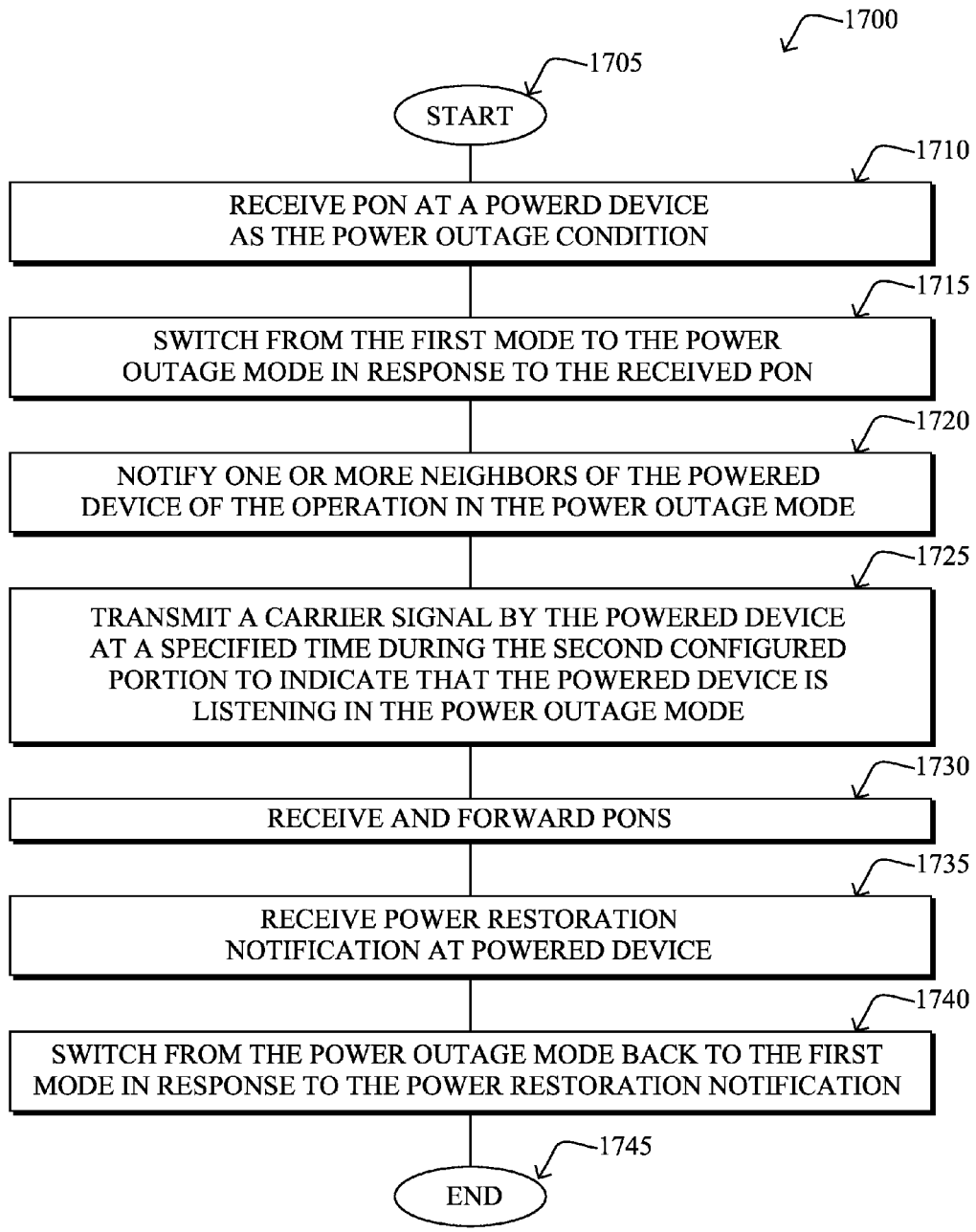
FIG. 17 illustrates an example simplified procedure for providing for efficient PON collection through dynamic use of broadcast schedules in a frequency hopping network, e.g., generically for both the reduced power device and the powered device.

Conversely, FIG. 17 illustrates an example simplified procedure for providing for efficient PON collection through dynamic use of broadcast schedules in a frequency hopping network in accordance with one or more embodiments described herein, e.g., for the powered device. The procedure 1700 starts at step 1705, and continues to step 1710, where, as described in detail above, a powered device (e.g., node 11) receives a PON 1200 as the power outage condition, and in response, switches from the first mode to the power outage mode in step 1715. As mentioned above, the powered device may then notify one or more of its neighbors (e.g., node 33 and node 44 via notifications 1300) of the operation in the power outage mode in step 1720. In addition, in an optional embodiment, the powered device may transmit a carrier signal in step 1725 at a specified time during the second configured portion to indicate that the powered device is listening in the power outage mode.

In step 1730, the device may receive, and correspondingly forward, one or more received PONs 1200 (e.g., allowed traffic). PONs may be received in step 1730 until the reduced-power device provides a power restoration notification, received by the powered device at step 1735, or else in response to not receiving PONs for a threshold period of time (indicating complete failure or un-notified restoration). Accordingly, the powered device in step 1740 may switch from the power outage mode back to the first mode, and the procedure 1700 ends in step 1745.

Again, it should be noted that while certain steps within procedures 1500-1700 may be optional as described above, the steps shown in FIGS. 15-17 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1500-1700 (e.g., even procedure 900 of FIG. 9) are described separately, certain steps from each procedure may be incorporated into each other procedure, and the procedures are not meant to be mutually exclusive.

The novel techniques described herein, therefore, provide for efficient PON collection through dynamic use of broadcast schedules in a frequency hopping network, particularly useful to ensure that the backup power allows for as many critical PON messages as possible to be transmitted and/or received before backup power is completely lost. In particular, a system in accordance with the techniques herein:

1) Allows devices to dynamically change the capacity allocated for broadcast communication when a power outage even occurs;
2) Increases the reliability of communicating PON messages by dynamically increasing the capacity for broadcast communication;

3) Optionally allows unicast traffic that does not interfere with broadcast traffic by allowing the unicast and broadcast schedules to coexist when in Power Outage Mode;
4) Increases the reliability of communicating PON messages by having powered devices notify other powered devices of the state transition;
5) Increases the reliability of communicating PON messages by utilizing a confirmation tone; and
6) Reduces the energy cost of confirming that neighboring nodes have switched into a Power Outage Mode by using channel-sampling techniques to listen for the tone.

While there have been shown and described illustrative embodiments that provide for efficient PON collection through dynamic use of broadcast schedules in a frequency hopping network, it is to be understood that various other adaptations and modifications may be made within the spirit and scope of the embodiments herein. For example, the embodiments have been shown and described herein with relation to wireless networks. However, the embodiments in their broader sense are not as limited, and may, in fact, be used with other types of shared media networks and/or protocols using frequency hopping, such as certain PLC protocols. Also, while the description above relates to packets, the techniques may be equally applicable to non-packetized transmissions. Moreover, while the above description is specifically discussed synchronized transmissions, it is possible to allow for various unsynchronized transmissions when it is desirable to do so.

Note also that while the values for X and Y as illustrated generally result in the boundaries for broadcast slots to be active slots 720 as opposed to broadcast windows 710. However, the embodiments are not so limited, and the period and length of values X and Y, with a known start time (e.g., the start of broadcast schedule 600) may be all that is needed to synchronize the network devices to the appropriate (and dynamic) broadcast operation, regardless of where the boundaries of the broadcast slots fall within the schedule 600.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   operating in a normal mode in a frequency hopping communication network according to a common broadcast schedule for the network that simultaneously overlays a first configured portion of all independently determined unicast listening schedules in the network;
   determining a power outage condition;
   operating in a power outage mode in response to the power outage condition, wherein the common broadcast schedule for the network in the power outage mode simultaneously overlays a second configured portion of all independently determined unicast listening schedules in the network, the second configured portion greater than the first configured portion; and
   wherein the second configured portion is configured based on a tradeoff between relatively higher power outage notification (PON) reliability at correspondingly higher lengths of the second configured portion versus relatively lower PON latency at correspondingly lower lengths of the second configured portion.

2. The method as in claim 1, further comprising:
   broadcasting one or more power outage notifications (PONs) from a device in response to determining the power outage condition as a reduction of a main power supply at the device.

3. The method as in claim 2, further comprising:
   determining a power lifetime during the power outage condition;
   determining a number of PONs supportable by device during the power outage condition;
   determining one or more transmission windows by dividing the power lifetime by the number; and
   broadcasting a particular PON within each transmission window.

4. The method as in claim 2, further comprising:
   broadcasting one or more initial PONs during the first configured portion in response to the power outage condition;
   broadcasting one or more remaining PONs during the second configured portion of the power outage mode.

5. The method as in claim 4, further comprising:
   listening for a carrier signal during the second configured portion;
   determining that a powered neighbor is listening in the power outage mode in response to hearing the carrier signal; and
   broadcasting the one or more remaining PONs during the second configured portion in response to determining that the powered neighbor is listening in the power outage mode.

6. The method as in claim 2, further comprising:
   ceasing all listening operations on the device during operation in the power outage mode.

7. The method as in claim 1, further comprising:
   receiving a power outage notification (PON) at a powered device as the power outage condition; and
   switching from the normal mode to the power outage mode in response to the received PON.

8. The method as in claim 7, further comprising:
   notifying one or more neighbors of the powered device of the operation in the power outage mode.

9. The method as in claim 8, wherein notifying comprises:
   transmitting one or more messages during the first configured portion.

10. The method as in claim 8, wherein notifying comprises:
    transmitting one or more messages using unsynchronized transmission during a third portion of all independently determined unicast listening schedules in the network that is other than the second configured portion.

11. The method as in claim 7, further comprising:
    transmitting a carrier signal by the powered device at a specified time during the second configured portion to indicate that the powered device is listening in the power outage mode.

12. The method as in claim 1, wherein the first configured portion is 0%.

13. The method as in claim 1, wherein the second configured portion is 100%.

14. The method as in claim 1, wherein the first configured portion is less than 50%, and wherein the second configured portion is greater than 50%.

15. An apparatus, comprising:
   a processor;
   a transceiver configured to communicate with a frequency hopping communication network that operates according to a common broadcast schedule for the network that simultaneously overlays a configured portion of all independently determined unicast listening schedules in the network; and
   a memory configured to store a process executable by the processor, the process when executed by the processor operable to:
   operate in a normal mode wherein the common broadcast schedule for the network simultaneously overlays a first configured portion of all independently determined unicast listening schedules in the network;
   determine a power outage condition;
   operate in a power outage mode in response to the power outage condition, wherein the common broadcast schedule for the network in the power outage mode simultaneously overlays a second configured portion of all independently determined unicast listening schedules in the network, the second configured portion greater than the first configured portion; and
   wherein the second configured portion is configured based on a tradeoff between relatively higher power outage notification (PON) reliability at correspondingly higher lengths of the second configured portion versus relatively lower PON latency at correspondingly lower lengths of the second configured portion.

16. The apparatus as in claim 15, wherein the process when executed is further operable to:
   broadcast one or more power outage notifications (PONs) in response to determining the power outage condition as a reduction of a main power supply at the apparatus.

17. The apparatus as in claim 16, wherein the process when executed is further operable to:
   broadcast one or more initial PONs during the first configured portion in response to the power outage condition;
   broadcast one or more remaining PONs during the second configured portion of the power outage mode.

18. The apparatus as in claim 17, wherein the process when executed is further operable to:
   listen for a carrier signal during the second configured portion;
   determine that a powered neighbor is listening in the power outage mode in response to hearing the carrier signal; and
   broadcast the one or more remaining PONs during the second configured portion in response to determining that the powered neighbor is listening in the power outage mode.

19. The apparatus as in claim 16, wherein the process when executed is further operable to:
   cease all listening operations on the device during operation in the power outage mode.

20. The apparatus as in claim 15, wherein the process when executed is further operable to:
   receive a power outage notification (PON) as the power outage condition while the apparatus is still main-powered; and
   switch from the normal mode to the power outage mode in response to the received PON.

21. The apparatus as in claim 20, wherein the process when executed is further operable to:
   notify one or more neighbors of the apparatus of the operation in the power outage mode.

22. A tangible, non-transitory, computer-readable media having software encoded thereon, the software, when executed by a processor on a device in a frequency hopping communication network that operates according to a common broadcast schedule for the network that simultaneously overlays a configured portion of all independently determined unicast listening schedules in the network, operable to:
   operate in a normal mode wherein the common broadcast schedule for the network simultaneously overlays a first configured portion of all independently determined unicast listening schedules in the network;
   determine a power outage condition;
   operate in a power outage mode in response to the power outage condition, wherein the common broadcast schedule for the network in the power outage mode simultaneously overlays a second configured portion of all independently determined unicast listening schedules in the network, the second configured portion greater than the first configured portion; and
   wherein the second configured portion is configured based on a tradeoff between relatively higher power outage notification (PON) reliability at correspondingly higher lengths of the second configured portion versus relatively lower PON latency at correspondingly lower lengths of the second configured portion.

23. The computer-readable medium as in claim 22, wherein the software when executed is further operable to:
   broadcast one or more power outage notifications (PONs) in response to determining the power outage condition as a reduction of a main power supply at a device on which the software is executed.

24. The computer-readable medium as in claim 22, wherein the software when executed is further operable to:
   receive a power outage notification (PON) as the power outage condition while a device on which the software is executed is still main-powered; and
   switch from the normal mode to the power outage mode in response to the received PON.

\* \* \* \* \*

UNITED STATES PATENT AND TRADEMARK OFFICE
CERTIFICATE OF CORRECTION

| | | Page 1 of 1 |
|---|---|---|
| PATENT NO. | : 9,001,676 B2 | |
| APPLICATION NO. | : 13/192802 | |
| DATED | : April 7, 2015 | |
| INVENTOR(S) | : Hui et al. | |

It is certified that error appears in the above-identified patent and that said Letters Patent is hereby corrected as shown below:

In the Specification

In column 16, line 29, please amend as follows:
for broadcast communication. Conversely, changing Y

In column 17, line 4, please amend as follows:
Mode is generally dependent on the application's require-

Signed and Sealed this
Eighth Day of September, 2015

Michelle K. Lee
*Director of the United States Patent and Trademark Office*